(12) United States Patent
Tabata et al.

(10) Patent No.: US 7,282,011 B2
(45) Date of Patent: Oct. 16, 2007

(54) CONTROL APPARATUS FOR CONTROLLING STEPPED AUTOMATIC TRANSMISSION OF VEHICLE

(75) Inventors: Atsushi Tabata, Okazaki (JP); Kazutoshi Nozaki, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 195 days.

(21) Appl. No.: 11/105,385

(22) Filed: Apr. 14, 2005

(65) Prior Publication Data
US 2005/0245349 A1 Nov. 3, 2005

(30) Foreign Application Priority Data
Apr. 28, 2004 (JP) ............................ 2004-134912
Apr. 28, 2004 (JP) ............................ 2004-134913

(51) Int. Cl.
*B60W 30/20* (2006.01)
(52) U.S. Cl. .............................. 477/109; 477/5; 477/83
(58) Field of Classification Search .................. 477/77, 477/3, 83, 101, 102; 701/64
See application file for complete search history.

(56) References Cited

U.S. PATENT DOCUMENTS

| 5,091,854 | A | 2/1992 | Yoshimura | |
| 6,149,544 | A | 11/2000 | Masberg et al. | |
| 6,969,338 | B2* | 11/2005 | Dreibholz et al. | ............ 477/77 |
| 2003/0017910 | A1* | 1/2003 | Fattic et al. | ................... 477/3 |
| 2003/0029653 | A1* | 2/2003 | Fujikawa | .................. 180/65.2 |
| 2003/0125850 | A1* | 7/2003 | Evans et al. | ................. 701/22 |
| 2003/0127262 | A1 | 7/2003 | Noreikat et al. | |
| 2005/0038576 | A1* | 2/2005 | Hara et al. | .................... 701/22 |

FOREIGN PATENT DOCUMENTS

| DE | 19532136 A1 | 3/1997 |
| JP | 60-256676 | 12/1985 |
| JP | 02-085838 U | 7/1990 |
| JP | 05-288269 | 11/1993 |
| JP | 09-291838 | 11/1997 |

(Continued)

OTHER PUBLICATIONS

Jul. 7, 2006 Office Action in Chinese Application No. 200510067920.6 for applicant Toyota Jidosha Kabushiki Kaisha.

(Continued)

*Primary Examiner*—Sherry Estremsky
*Assistant Examiner*—Edwin A. Young
(74) *Attorney, Agent, or Firm*—Kenyon & Kenyon LLP

(57) ABSTRACT

A control apparatus for controlling a stepped automatic transmission of a vehicle having an output shaft and an input shaft which is to be connected to an engine of the vehicle through a clutch while a shifting action is being effected in the transmission. The control apparatus includes a torque vibration restrainer operable, upon completion of the shifting action in the transmission, to restrain a torque vibration which is generated in a power transmitting path of the vehicle. The torque vibration restrainer applies an inverted-phase torque vibration which is inverted in phase with respect to the generated torque vibration, to the power transmitting path, and/or place the clutch in its slipping state or released state, for restraining the generated torque vibration.

13 Claims, 16 Drawing Sheets

| | FOREIGN PATENT DOCUMENTS | |
|---|---|---|
| JP | 09-308008 | 11/1997 |
| JP | 09-331603 | 12/1997 |
| JP | 10-024745 | 1/1998 |
| JP | 10-109572 A | 4/1998 |
| JP | 11-245691 A | 9/1999 |
| JP | 2000-145950 A | 5/2000 |
| JP | 2002-005204 A | 1/2002 |

OTHER PUBLICATIONS

German Language Version of German Official Letter, Appln. No. 10 2005 019 610.1-14 dated Apr. 3, 2007.
English Translation of German Official Letter, Appln. No. 10 2005 019 610.1-14 dated Apr. 3, 2007.

* cited by examiner

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  | O |  |  |
| R1 |  |  | O |  |  | O |
| R2 |  |  |  | O |  | O |

O : ENGAGED STATE

CONTROL APPARATUS FOR CONTROLLING STEPPED AUTOMATIC TRANSMISSION OF VEHICLE

This application is based on Japanese Patent Applications Nos. 2004-134912 and 2004-134913 filed in Apr. 28, 2004, the content of which is incorporated hereinto by reference.

BACKGROUND OF THE INVENTION

1. Field of the Invention

The present invention relates in general to a control apparatus for controlling a stepped automatic transmission of a vehicle. More particularly, the invention is concerned with a technique for restraining a torque vibration generated immediately after a shifting action of the transmission which is effected while an input shaft of the transmission and an engine of the vehicle are being mechanically connected to each other.

2. Discussion of Related Art

There is known a vehicle equipped with a stepped automatic transmission having an input shaft that is to be mechanically connected to an engine of the vehicle during a shifting action in which the transmission is shifted to a selected one of a plurality of drive positions (gear positions), as disclosed in U.S. patent application Publication US 2003/0127262A1, JP-H09-291838A, JP-H09-308008A, JP-H09-331603A and JP-H10-24745A. For example, in the vehicle disclosed in US 2003/0127262A1, the engine and the stepped automatic transmission are operatively connected to each other through a direct connection clutch which is disposed therebetween in place of a fluid-operated power transmitting device (such as a fluid-operated torque converter) having a high capacity of absorbing a torque vibration. The vehicle disclosed in US 2003/0127262A1 is further equipped with an electric motor provided on each of a rotary input member and a rotary output member of the clutch, so that the vehicle can be driven by the motor while the clutch is placed in its released state, and so that the vehicle can be driven by the engine or by both the engine and the motor while the clutch is placed in its engaged state.

In the vehicle disclosed in US 2003/0127262A1 in which the input shaft of the stepped automatic transmission and the engine are mechanically connected to each other, the speed ratio of the transmission is changed in a step-like manner through the shifting action which is completed for a relatively short length of time. In change of the speed ratio of the transmission, a rotational speed of the engine is rapidly changed to a synchronous speed corresponding to the changed speed ratio of the transmission. When the rotational speed of the engine becomes equalized to the synchronous speed, the change of the rotational speed of the engine is quickly stopped. In this instance, the quick stop of the change of the engine speed causes an elastic torsional vibration in a power transmitting path between the engine and a wheel of the vehicle, thereby leading to a possible occurrence of a shift shock. Such a problem is encountered also in a vehicle in which a fluid-operated power transmitting device equipped with a lock-up clutch is disposed between the engine and the transmission. That is, the vehicle having the fluid-operated power transmitting device suffers from the same problem, when the shifting action of the transmission is effected with the lock-up clutch being placed in its engaged state.

SUMMARY OF THE INVENTION

The present invention was made in the light of the background art discussed above. It is therefore an object of the present invention to provide a control apparatus capable of controlling a stepped automatic transmission which has an input shaft mechanically connectable to an engine and which is shifted to a selected one of a plurality of drive positions in such a manner that minimizes or reduces a shift shock occurred upon completion of the shifting action in the transmission. This object of the invention may be achieved according to any one of first through eighteenth aspects of the invention which are described below.

The first aspect of this invention provides a control apparatus for controlling a stepped automatic transmission of a vehicle having an output shaft and an input shaft which is to be mechanically connected to an engine of the vehicle while a shifting action is being effected in the transmission. The control apparatus includes a torque vibration restrainer operable, upon completion of the shifting action in the transmission, to restrain a torque vibration which is generated in a power transmitting path of the vehicle.

According to the second aspect of the invention, the control apparatus defined in the first aspect of the invention further includes a shifting-action completion determiner operable to determine whether the shifting action has been completed or not, depending upon whether a rotational speed of the input shaft has been substantially equalized to a product of a rotational speed of the output shaft and a newly established speed ratio of the transmission which is established as a result of the shifting action. The shifting-action completion determiner determines that the shifting action has been completed when the rotational speed of the input shaft has been substantially equalized to the product of the rotational speed of the output shaft and the newly established speed ratio of the transmission. The torque vibration restrainer is initiated to be operated, upon determination by the shifting-action completion determiner that the shifting action has been completed, to restrain the torque vibration.

According to the third aspect of the invention, in the control apparatus defined in the first or second aspect of the invention, the torque vibration restrainer applies an opposite-phase or inverted-phase torque vibration which is opposite or inverted in phase with respect to the generated torque vibration, to the power transmitting path, so as to restrain the generated torque vibration.

According to the fourth aspect of the invention, in the control apparatus defined in the third aspect of the invention, the torque vibration restrainer includes an inverted-phase-torque-vibration controller operable to cause a motor which is operatively connected to the input shaft of the transmission, to output the inverted-phase torque vibration.

According to the fifth aspect of the invention, in the control apparatus defined in the third or fourth aspect of the invention, the input shaft of the transmission and the engine are to be connected to each other through a clutch which is to be engaged for direct connection of the input shaft and the engine. The torque vibration restrainer includes a clutch controller operable, upon completion of the shifting action in the transmission, to temporarily place the clutch in one of a slipping state thereof and a released state thereof.

According to the sixth aspect of the invention, the control apparatus defined in the fifth aspect of the invention further includes an inverted-phase-torque-vibration availability determiner operable to determine whether application of the inverted-phase torque vibration to the power transmitting path by the torque vibration restrainer can be made upon completion of the shifting action. The clutch controller of the torque vibration restrainer is operated where it is determined by the inverted-phase-torque-vibration availability determiner that the application of the inverted-phase torque vibration by the torque vibration restrainer can not be made, so as to temporarily place the clutch in the above-described one of the slipping state thereof and the released state thereof, for restraining the generated torque vibration.

According to the seventh aspect of the invention, in the control apparatus defined in any one of the third through sixth aspects of the invention, the torque vibration restrainer includes (i) an output torque reducer operable to temporarily reduce an output torque of the engine in a final stage of the shifting action, and (ii) an inverted-phase-torque-vibration controller operable to change an amplitude of the inverted-phase torque vibration on the basis of a reduction amount by which the output torque of the engine is reduced by the output torque reducer.

According to the eighth aspect of the invention, in the control apparatus defined in any one of the third through seventh aspects of the invention, the torque vibration restrainer includes an inverted-phase-torque-vibration controller operable to change an amplitude of the inverted-phase torque vibration on the basis of a currently selected one of drive positions of the stepped automatic transmission.

According to the ninth aspect of the invention, in the control apparatus defined in the first or second aspect of the invention, the input shaft of the transmission and the engine are to be connected to each other through a clutch which is to be engaged for direct connection of the input shaft and the engine. The torque vibration restrainer includes a clutch controller operable, upon completion of the shifting action in the transmission, to place the clutch in one of a slipping state thereof and a released state thereof, for restraining the generated torque vibration.

According to the tenth aspect of the invention, the control apparatus defined in the ninth aspect of the invention further includes a clutch controllability determiner operable to determine whether placement of the clutch in the above-described one of the slipping state and the released state can be made upon completion of the shifting action. The torque vibration restrainer includes a restraining torque applier operable where it is determined by the clutch controllability determiner that the placement of the clutch in the above-described one of the slipping state and the released state can not be made, so as to apply a restraining torque to the power transmitting path, for restraining the generated torque vibration.

According to the eleventh aspect of the invention, in the control apparatus defined in the tenth aspect of the invention, the restraining torque applier of the torque vibration restrainer causes a motor operatively connected to the input shaft of the transmission, to output the restraining torque for restraining the generated torque vibration.

According to the twelfth aspect of the invention, in the control apparatus defined in the eleventh aspect of the invention, the restraining torque applier of the torque vibration restrainer includes an inverted-phase-torque-vibration controller operable to cause the motor to output, as the restraining torque, an inverted-phase torque vibration which is inverted in phase with respect to the generated torque vibration.

According to the thirteenth aspect of the invention, in the control apparatus defined in any one of the ninth through twelfth aspects of the invention, the torque vibration restrainer includes an output torque reducer operable to temporarily reduce an output torque of the engine in a final stage of the shifting action.

According to the fourteenth aspect of the invention, in the control apparatus defined in the thirteenth aspect of the invention, the clutch controller is operated to place the clutch in the above-described one of the slipping state thereof and the released state thereof, if a temporal reduction of the output torque of the engine by the output torque reducer can not be made.

According to the fifteenth aspect of the invention, in the control apparatus defined in the twelfth aspect of the invention, the inverted-phase-torque-vibration controller changes an amplitude of the inverted-phase torque vibration on the basis of an amount of reduction in an inertia torque which is generated upon completion of the shifting action.

According to the sixteenth aspect of the invention, in the control apparatus defined in the twelfth or fifteenth aspect of the invention, the inverted-phase-torque-vibration controller changes an amplitude of the inverted-phase torque vibration on the basis of kind of the shifting action effected in the transmission.

According to the seventeenth aspect of the invention, in the control apparatus defined in any one of the ninth through sixteenth aspects of the invention, the clutch controller of the torque vibration restrainer changes an amount of slipping of the clutch on the basis of an amount of reduction in an inertia torque which is generated upon completion of the shifting action.

According to the eighteenth aspect of the invention, in the control apparatus defined in any one of the ninth through seventeenth aspects of the invention, the clutch controller of the torque vibration restrainer changes an amount of slipping of the clutch on the basis of kind of the shifting action effected in the transmission.

In the control apparatus of each of the above-described first through eighteenth aspects of the invention for controlling the stepped automatic transmission of the vehicle, the torque vibration restrainer is provided to be operated, upon completion of the shifting action in the transmission, to reduce or restrain the torque vibration generated in the power transmitting path of the vehicle, thereby making it possible to minimize or reduce a shift shock caused by the torque vibration. The control apparatus preferably includes the shifting-action completion determiner, as defined in the second aspect of the invention, which determines that the shifting action has been completed when the rotational speed of the input shaft has been substantially equalized to the product of the rotational speed of the output shaft and the newly established speed ratio of the transmission, namely, when the rotational speed of the input shaft has been substantially equalized to a synchronous speed corresponding to the newly established speed ratio of the transmission, so that the torque vibration restrainer can be initiated to be operated, precisely upon determination by the shifting-action completion determiner that the shifting action has been completed, to restrain the torque vibration. It is noted that the term "power transmitting path" may be interpreted to mean a path through which a drive power or output of a drive power source of the vehicle is transmitted to drive wheels of the vehicle.

In the control apparatus of any one of the third through eighth aspects of the invention, the torque vibration restrainer is arranged to apply the inverted-phase torque vibration to the power transmitting path upon completion of the shifting action in the transmission, so that the torque vibration (generated in the power transmitting path as a result of a quick stop of the change of the rotational speed of the engine which takes place upon completion of the shifting action) can be effectively counteracted or offset by the inverted-phase torque vibration which is inverted in phase with respect to the generated torque vibration, namely, which is different in phase from the generated torque vibration by about 180°. The generated torque vibration can be thus effectively offset by the inverted-phase torque vibration, thereby making it possible to reduce the shift shock caused by the torque vibration which is generated upon completion of the shifting action.

In the control apparatus of the fourth aspect of the invention, the torque vibration restrainer includes the inverted-phase-torque-vibration controller operable to cause the electric motor to output the inverted-phase torque vibration applied to the transmission input shaft which is operatively connected to the motor, so that the generated torque vibration can be effectively offset by the inverted-phase torque vibration outputted from the motor.

In the control apparatus of the fifth or sixth aspect of the invention, the torque vibration restrainer includes the clutch controller which is operated, upon completion of the shifting action in the transmission, to temporarily place the clutch in its slipping state or released state, so that the generated torque vibration can be restrained by cooperation of the application of the inverted-phase torque vibration and the placement of the clutch in the slipping sate or released state.

In the control apparatus of the sixth aspect of the invention, the inverted-phase-torque-vibration availability determiner is further provided to determine whether or not the inverted-phase torque vibration is available to be applied to the power transmitting path upon completion of the shifting action. The clutch controller of the torque vibration restrainer is operated to temporarily place the clutch in its slipping state or released state, in a case where it is determined by the inverted-phase-torque-vibration availability determiner that the inverted-phase torque vibration is not available. This arrangement makes it possible to reduce the shift shock to some extent, by the placement of the clutch in its slipping state or released state, in the case where the application of the inverted-phase torque vibration by the torque vibration restrainer or the inverted-phase-torque-vibration controller becomes impossible.

In the control apparatus of the seventh aspect of the invention, the torque vibration restrainer includes the output torque reducer operated to temporarily reduce the output torque of the engine in the final stage of the shifting action, and the inverted-phase-torque-vibration controller operated to change the amplitude of the inverted-phase torque vibration on the basis of the reduction amount by which the engine output torque is reduced by the output torque reducer. In this arrangement, since the torque vibration generated upon completion of the shifting action is reduced to some extent by the output torque reducer, it is possible to lighten a load on an inverted-phase torque vibration generator, such as an electric motor operatively connected to the input shaft of the transmission, which is operable to generate the inverted-phase torque vibration for offsetting the torque vibration generated as a result of the quick stop of the change of the rotational speed of the engine.

In the control apparatus of the eighth aspect of the invention, the torque vibration restrainer includes the inverted-phase-torque-vibration controller operable to change the amplitude of the inverted-phase torque vibration on the basis of a currently selected one of drive positions of the transmission. Since the amplitude of the torque vibration generated as a result of the quick stop of the change of the rotational speed of the engine varies depending upon the currently selected drive position of the transmission, the shift shock caused by the torque vibration can be further effectively reduced, by changing the amplitude of the inverted-phase torque vibration on the basis of the currently selected drive position of the transmission.

In the control apparatus of any one of the ninth through eighteenth aspects of the invention, the torque vibration restrainer includes the clutch controller operated to place the clutch in its slipping state or released state upon completion of the shifting action in the transmission, thereby making it possible to absorb the torque vibration which is generated as a result of the quick stop of the change of the rotational speed of the engine, and accordingly reduce the shift shock caused by the torque vibration upon completion of the shifting action in the transmission.

In the control apparatus of any one of the tenth through twelfth aspects of the invention, the clutch controllability determiner is provided to determine whether the placement of the clutch in its slipping state or released state can be made or not upon completion of the shifting action, so that the restraining torque applier of the torque vibration restrainer is operated to apply the restraining torque to the power transmitting path, in a case where it is determined by the clutch controllability determiner that the placement of the clutch in its slipping state or released state can not be made. That is, in the case where the torque vibration can not be absorbed by the slipping or releasing of the clutch, the torque vibration generated in the power transmitting path is restrained by the retraining torque in place of the slipping or releasing of the clutch, whereby the shift shock can be reduced even in the case where the placement of the clutch in its slipping state or released state can not be made.

In the control apparatus of the eleventh or twelfth aspect of the invention, the restraining torque applier of the torque vibration restrainer causes the motor, which is operatively connected to the input shaft of the transmission, to output the restraining torque for restraining the generated torque vibration, so that the generated toque vibration is restrained by the restraining torque applied to the power transmitting path, whereby the shift shock caused by the vibration torque can be reduced.

In the control apparatus of the twelfth aspect of the invention, the restraining torque applier of the torque vibration restrainer includes the inverted-phase-torque-vibration controller operated to cause the motor to output, as the restraining torque, the inverted-phase torque vibration which is inverted in phase with respect to the generated torque vibration, so that the torque vibration can be effectively counteracted or offset by the inverted-phase torque vibration which is inverted in phase with respect to the generated torque vibration. The generated torque vibration can be thus effectively offset by the inverted-phase torque vibration, thereby making it possible to reduce the shift shock caused by the torque vibration which is generated upon completion of the shifting action.

In the control apparatus of the thirteenth or fourteenth aspect of the invention, the torque vibration restrainer includes the output torque reducer operated to temporarily reduce the output torque of the engine in the final stage of the shifting action. In this arrangement, since the torque vibration generated upon completion of the shifting action is reduced by the output torque reducer, it is possible to reduce the required amount of clutch slipping for absorbing the torque vibration and the required amplitude of the inverted-phase torque vibration for offsetting the torque vibration.

In the control apparatus of the fifteenth or sixteenth aspect of the invention, the inverted-phase-torque-vibration controller is arranged to change the amplitude of the inverted-phase torque vibration on the basis of the amount of reduction in the inertia torque which is generated upon completion of the shifting action, or on the basis of the kind of the shifting action currently effected in the transmission, so that the torque vibration generated upon completion of the shifting action can be offset by the inverted-phase torque vibration whose amplitude is suitably adjusted.

In the control apparatus of the seventeenth or eighteenth aspect of the invention, the clutch controller is arranged to change the amount of slipping of the clutch on the basis of the amount of reduction in the inertia torque which is generated upon completion of the shifting action, or on the basis of the kind of the shifting action currently effected in the transmission, so that the torque vibration generated upon completion of the shifting action can be absorbed by the slipping of the clutch whose amount is suitably adjusted.

The stepped automatic transmission, which is to controlled by the control apparatus constructed according to the invention, may be of any one of various types such as a planetary-gear type and a synchromesh two-parallel-axes type. The planetary-gear-type transmission is equipped with a plurality of planetary gear sets each having a plurality of rotary elements. In this planetary-gear-type transmission, a plurality of drive positions are selectively established by connecting selected ones of the rotary elements of the planetary gear sets through hydraulically operated frictional coupling devices. On the other hand, the synchromesh two-parallel-axes-type transmission is equipped with plural sets of gears, so that each set of gears are mounted on respective two parallel shafts and are permanently mesh with each other. In this synchromesh two-parallel-axes-type transmission, a plurality of drive positions are selectively established by placing a selected one of the gear sets into its power transmitting state by a synchronous coupling device which is actuated by a hydraulically operated actuator. The stepped automatic transmission may be used for a front-engine front-drive (FF vehicle) in which the transmission is installed on a body of the vehicle such that the axis of the transmission is parallel to the transverse or lateral direction of the vehicle, or alternatively may be used for a front-engine rear-drive (FR vehicle) in which the transmission is installed on the vehicle body such that the axis of the transmission is parallel to the longitudinal or running direction of the vehicle.

Further, the stepped automatic transmission may be provided by a multiple-step transmission having a total of four, five, six, seven, eight or more forward drive positions. That is, the number of the drive positions, which can be established in the transmission, is not particularly limited, as long as the transmission is constructed such that a selected one of the plurality drive positions is established therein.

Between the engine and the input shaft of the transmission, there may be disposed a direct connection clutch, a damper, a direct connection clutch equipped with a damper, or a fluid-operated torque converter equipped with a lock-up clutch (direct connection clutch). However, the engine and the input shaft of the transmission may be permanently connected to each other. The principle of the invention is applicable to any type of vehicle, as long as the engine and the input shaft of the transmission are brought into mechanical connection with each other when a shifting action is effected in the transmission of the vehicle.

It is preferable that a direct connection clutch is disposed between the engine and the input shaft of the transmission. In this arrangement with the clutch, first and second electric motors as the above-described motor may be provided in an input rotary member and an output rotary member of the clutch, respectively, which are coupled with each other when the clutch is placed in its engaged state, so that the inverted-phase torque vibration can be outputted from the first electric motor and/or the second electric motor. It is noted that this arrangement may be modified such that the second electric motor is provided in other member such as the output shaft of the transmission.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENT

Figure 1:
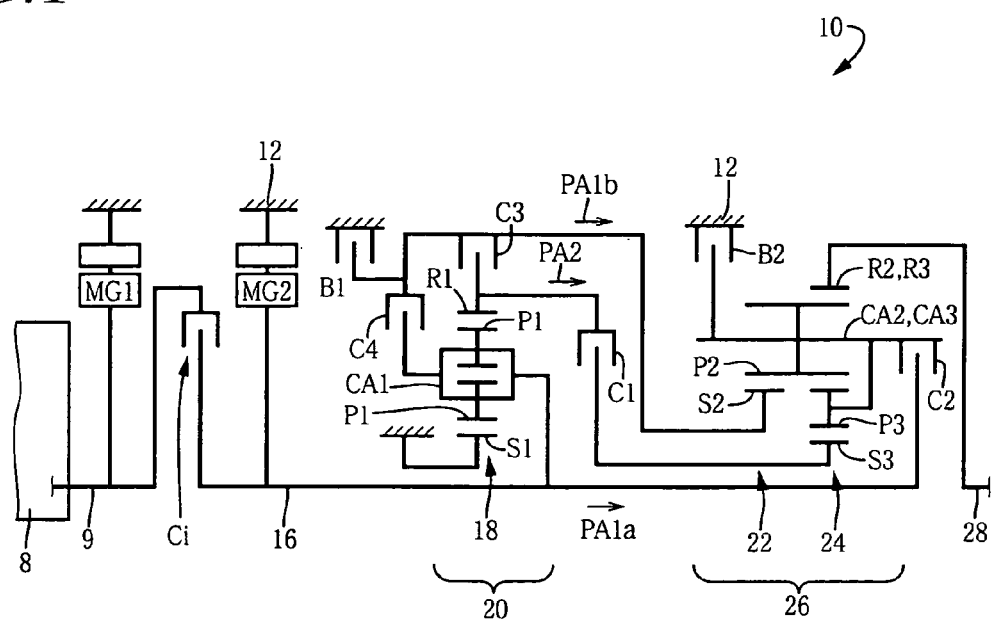
FIG. 1 is a schematic view illustrating a basic arrangement of a stepped automatic transmission that is to be controlled by a control apparatus constructed according to the present invention.

Referring to first to the schematic view of FIG. 1, there is illustrated a basic arrangement of a vehicle automatic transmission in the form of a stepped automatic transmission (hereinafter referred to simply as "transmission") 10, which is to be disposed between an engine 8 as a drive power source and drive wheels (not shown) so as to transmit an output of the engine 8 as a power drive source to the drive wheels. As shown in FIG. 1, the transmission 10 has a transmission casing 12 to be fixed to a body of the vehicle, and includes: a direct connection clutch Ci; an input shaft 16 connected to the clutch Ci; a first transmission unit 20 constituted principally by a first planetary gear set 18; a second transmission unit 26 constituted principally by a second planetary gear set 22 and a third planetary gear set 24; and an output shaft 28. The input shaft 16, the first transmission unit 20, the second transmission unit 26 and the output shaft 28 are disposed coaxially with each other within the transmission casing 12, in the order of description. The input shaft 16 is arranged to be connectable to a crankshaft 9 of the engine 8 through the clutch Ci. The output shaft 28 is arranged to rotate the right and left drive wheels through a differential gear device (not shown). The input shaft 16 functions as an output rotary member of the clutch Ci and also functions as an input rotary member of the transmission 10, while the output shaft 28 functions as an output rotary member of the transmission 10. The transmission casing 12 functions as a stationary or non-rotary member. Since the transmission 10 is constructed symmetrically with respect to its axis, the lower half of the transmission 10 located below the axis is omitted in the schematic view of FIG. 1.

The first planetary gear set 18 constituting the first transmitting unit 20 is of double-pinion type, and includes a first sun gear S1, plural pairs of first planetary or pinion gears P1 (each pair of gears P1 mesh with each other), a first carrier CA1 supporting the first pinion gears P1, and a first ring gear R1 meshing with the first sun gear S1 through the first pinion gears P1. The first carrier CA1 supports the first pinion gears P1 such that the first pinion gears P1 are rotatable about their respective axes and are rotatable about the axis of the first sun gear S1. The first carrier CA1 is connected to the input shaft 16 so as to be driven by the input shaft 16. The first sun gear S1 is fixed to the transmission casing 12 so as to be unrotatable. The first ring gear R1 serving as a transmitting member is rotated at a speed that is made lower than the rotational speed of the input shaft 16, and the rotary motion of the first ring gear R1 is transmitted to the second transmission unit 26. The rotary motion of the input shaft 16 is transmittable to the second transmission unit 26 through two different intermediate transmitting paths PA1, PA2 such that a speed of the rotary motion as transmitted through the second intermediate transmitting path PA2 is lower than a speed of the rotary motion as transmitted through the first intermediate transmitting path PA1. The rotary motion of the input shaft 16 is transmitted to the second transmission unit 26 through the first intermediate transmitting path PA1, without the speed of the rotary motion being changed, namely, with a speed ratio of 1.0. The first intermediate transmitting path PA1 includes a direct transmitting portion PA1a and an indirect transmitting portion PA1b. The direct transmitting portion PA1a transmits the rotary motion of the input shaft 16 directly to the second transmission unit 26 without via the first planetary gear set 18. The indirect transmitting portion PA1b transmits the rotary motion of the input shaft 16 to the second transmission unit 26 via the carrier CA1 of the first planetary gear set 18. Meanwhile, the rotary motion of the input shaft 16 is transmitted to the second transmission unit 26 through the second intermediate transmitting path PA2 (which is partially constituted by the first carrier CA1, the first pinion gears P1 supported by the first carrier CA1 and the first ring gear R1), with the speed of the rotary motion being reduced, namely, with a speed ratio larger than 1.0.

The second planetary gear set 22 of the second transmitting unit 26 is of single-pinion type, and includes a second sun gear S2, a plurality of second pinion gears P2, a second carrier CA2 supporting the second pinion gears P2 (such that the second pinion gears P2 are rotatable about their respective axes and are rotatable about the axis of the second sun gear S2), and a second ring gear R2 meshing with the second sun gear S2 through the second pinion gears P2. The third planetary gear set 24 of the second transmitting unit 26 is of double-pinion type, and includes a third sun gear S3, plural pairs of third pinion gears P3 (each pair of gears P3 mesh with each other), a third carrier CA3 supporting the third pinion gears P3 (such that the third pinion gears P3 are rotatable about their respective axes and are rotatable about the axis of the third sun gear S3), and a third ring gear R3 meshing with the third sun gear S3 through the third pinion gears P3.

The second transmission unit 26 constitutes first, second, third and fourth rotary modules RM1-RM4, each of which is provided by at least one of the above-described sun gears S2, S3, carriers CA2, CA3 and ring gears R2, R3. Described specifically, the first rotary module RM1 is provided by the sun gear S2 of the second planetary gear set 22. The second rotary module RM2 is provided by the carriers CA2, CA3 of the respective second and third planetary gear sets 22, 24 which are integrally connected to each other. The third rotary module RM3 is provided by the ring gears R2, R3 of the respective second and third planetary gear sets 22, 24 which are integrally connected to each other. The fourth rotary module RM4 is provided by the sun gear S3 of the third planetary gear set 24.

The first rotary module RM1 (S2) is selectively connected to the transmission casing 12 through a first brake B1 so as to be unrotatable, while being selectively connected to the first ring gear R1 of the first planetary gear set 18 through a third clutch C3, i.e., to the second intermediate transmitting path PA2 through the third clutch C3. The first rotary module RM1 (S2) is further selectively connected to the input shaft 16 through a fourth clutch C4, i.e., to the direct transmitting portion PA1a of the first intermediate transmitting path PA1 through the fourth clutch C4. The second rotary module RM2 (CA2, CA3) is selectively connected to the transmission casing 12 through a second brake B2 so as to be unrotatable, while being selectively connected to the input shaft 16 through a second clutch C2. The third rotary module RM3 (R2, R3) is integrally connected to the output shaft 28. The fourth rotary module RM4 (S3) is connected to the ring gear R1 of the first planetary gear set 18 through a first clutch C1. It is noted that the first and second B1, B2 and the first, second, third and fourth clutches C1-C4 and are all hydraulically operated frictional coupling devices, for example, of multi-disc type each having a plurality of friction plates which are superposed on each other and forced against each other by a hydraulic cylinder.

Figures 2, 3:
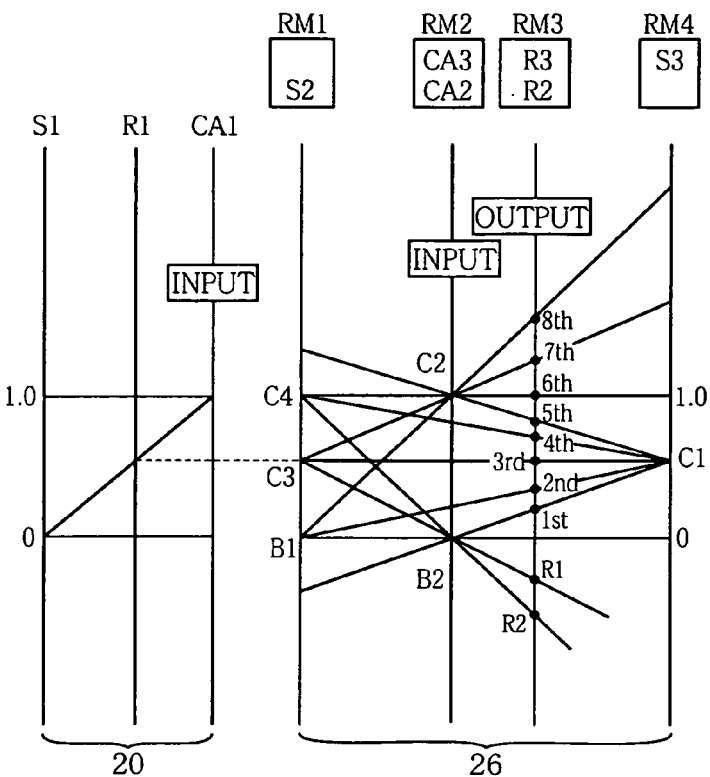
FIG. 2 is a collinear chart showing relative rotational speeds of a plurality of rotary modules incorporated in the transmission of FIG. 1.
FIG. 3 is a table indicating a relationship between drive positions of the transmission of FIG. 1 and combinations of operating states of hydraulically operated frictional coupling devices to establish the respective drive positions.

FIG. 2 is a collinear chart indicating, by parallel straight lines, a relationship among the rotational speeds of the rotary modules in each of the drive positions of the transmission 10. In this collinear chart of FIG. 2, a lower horizontal straight line indicates the rotational speed of "0", while an upper horizontal straight line indicates the rotational speed of "1.0", i.e., the rotational speed of the input shaft 16. Three vertical straight lines of the first transmission unit 20 respectively represent three rotary elements of the first planetary gear set 18, i.e., the sun gear S1, ring gear R1 and carrier CA1 of the first planetary gear set 18 in this order of description as viewed in the direction from the left toward the right in the collinear chart of FIG. 2. The distances between the adjacent ones of the vertical straight lines are determined by a gear ratio $\rho_1$ of the first planetary gear set 18, i.e., a ratio of number of teeth of the first sun gear S1 to number of teeth of the first ring gear R1. In the example represented by the collinear chart of FIG. 2, the gear ratio $\rho_1$ of the first planetary gear set 18 is 0.463. Four vertical straight lines of the second transmission unit 26 respectively represent the first rotary module RM1 (S2), the second rotary module RM2 (CA2, CA3), the third rotary module RM3 (R2, R3) and the fourth rotary module RM4 (S3). The distances between the adjacent ones of the vertical straight lines are determined by gear ratios $\rho_2$, $\rho_3$ of the respective second and third planetary gear sets 22, 24. In the example represented by the collinear chart of FIG. 2, the gear ratios $\rho_2$, $\rho_3$ are 0.463 and 0.415, respectively.

As is apparent from the collinear chart of FIG. 2, a first-speed position (1st speed position) having the highest speed ratio (i.e., the highest ratio of the rotational speed of the input shaft 16 to the rotational speed of the output gear 28) is established by engaging the first clutch C1 and the second brake B2. That is, with the first clutch C1 being brought into its engaged state, the rotary motion of the input shaft 16 is transmitted to the fourth rotary module RM4 through the first transmission unit 20 such that the fourth rotary module RM4 is rotated at a speed that is made lower than the rotational speed of the input shaft 16. With the second brake B2 being brought into its engaged state, the second rotary module RM2 is rendered unrotatable. Consequently, the third rotary module RM3 connected to the output gear 28 is rotated at a speed that is indicated by "1st" in the collinear chart of FIG. 2, while the transmission 10 is being placed in the 1st speed position.

A second-speed position (2nd speed position) having a speed ratio lower than that of the 1st speed position is established by engaging the first clutch C1 and the first brake B1. That is, with the first clutch C1 being brought into its engaged state, the fourth rotary module RM4 is rotated at the speed lower than the rotational speed of the input shaft 16. With the first brake B1 being brought into its engaged state, the first rotary module RM1 is rendered unrotatable. Consequently, the third rotary module RM3 is rotated at a speed that is indicated by "2nd" in the collinear chart of FIG. 2, while the transmission 10 is being placed in the 2nd speed position.

A third-speed position (3rd speed position) having a speed ratio lower than that of the 2nd speed position is established by engaging the first clutch C1 and the third clutch C3. That is, with the first clutch C1 being brought into its engaged state, the fourth rotary module RM4 is rotated at the speed lower than the rotational speed of the input shaft 16. With the third clutch C3 being brought into its engaged state, the rotary motion of the input shaft 16 is transmitted to the first rotary module RM1 through the first transmission unit 20 such that the first rotary module RM1 is rotated at the speed that is made lower than the rotational speed of the input shaft 16. Consequently, the third rotary module RM3 is rotated at a speed that is indicated by "3rd" in the collinear chart of FIG. 2, while the transmission 10 is being placed in the 3rd speed position.

A fourth-speed position (4th speed position) having a speed ratio lower than that of the 3rd speed position is established by engaging the first clutch C1 and the fourth clutch C4. That is, with the first clutch C1 being brought into its engaged state, the fourth rotary module RM4 is rotated at the speed lower than the rotational speed of the input shaft 16. With the fourth clutch C4 being brought into its engaged state, the first rotary module RM1 is rotated at the same speed as the input shaft 16. Consequently, the third rotary module RM3 is rotated at a speed that is indicated by "4th" in the collinear chart of FIG. 2, while the transmission 10 is being placed in the 4th speed position.

A fifth-speed position (5th speed position) having a speed ratio lower than that of the 4th speed position is established by engaging the first clutch C1 and the second clutch C2. That is, with the first clutch C1 being brought into its engaged state, the fourth rotary module RM4 is rotated at the speed lower than the rotational speed of the input shaft 16. With the second clutch C2 being brought into its engaged state, the second rotary module RM2 is rotated at the same speed as the input shaft 16. Consequently, the third rotary module RM3 is rotated at a speed that is indicated by "5th" in the collinear chart of FIG. 2, while the transmission 10 is being placed in the 5th speed position.

A sixth-speed position (6th speed position) having a speed ratio lower than that of the 5th speed position is established by engaging the second clutch C2 and the fourth clutch C4. That is, with the second clutch C2 being brought into its engaged state, the second rotary module RM2 is rotated at the same speed as the input shaft 16. With the fourth clutch C4 being brought into its engaged state, the first rotary module RM1 is rotated at the same speed as the input shaft 16. Consequently, the third rotary module RM3 is rotated at a speed that is indicated by "6th" in the collinear chart of FIG. 2, while the transmission 10 is being placed in the 6th speed position. The speed ratio of this 6th speed position is 1.0.

A seventh-speed position (7th speed position) having a speed ratio lower than that of the 6th speed position is established by engaging the second clutch C2 and the third clutch C3. That is, with the second clutch C2 being brought into its engaged state, the second rotary module RM2 is rotated at the same speed as the input shaft 16. With the third clutch C3 being brought into its engaged state, the first rotary module RM1 is rotated at the speed that is made lower than the rotational speed of the input shaft 16. Consequently, the third rotary module RM3 is rotated at a speed that is indicated by "7th" in the collinear chart of FIG. 2, while the transmission 10 is being placed in the 7th speed position.

A eighth-speed position (8th speed position) having a speed ratio lower than that of the 7th speed position is established by engaging the second clutch C2 and the first brake B1. That is, with the second clutch C2 being brought into its engaged state, the second rotary module RM2 is rotated at the same speed as the input shaft 16. With the first brake B1 being brought into its engaged state, the first rotary module RM1 is rendered unrotatable. Consequently, the third rotary module RM3 is rotated at a speed that is indicated by "8th" in the collinear chart of FIG. 2, while the transmission 10 is being placed in the 8th speed position.

The transmission 10 has first and second rear drive positions R1, R2 in addition to the above-described eight forward drive positions. The first rear drive position (R1) has a speed ratio higher than that of the second rear drive position (R2), and is established by engaging the third clutch C3 and the second brake B2. With the third clutch C3 being brought into its engaged state, the first rotary module RM1 is rotated at the speed that is made lower than the rotational speed of the input shaft 16. With the second brake B2 being brought into its engaged state, the second rotary module RM2 is rendered unrotatable. Consequently, the third rotary module RM3 is reversely rotated at a speed that is indicated by "R1" in the collinear chart of FIG. 2, while the transmission 10 is being placed in the first rear drive position (R1). The second rear drive position (R2), having a speed ratio lower than that of the first rear drive position (R1), is established by engaging the fourth clutch C4 and the second brake B2. With the fourth clutch C4 being brought into its engaged state, the first rotary module RM1 is rotated at the same speed as the input shaft 16. With the second brake B2 being brought into its engaged state, the second rotary module RM2 is rendered unrotatable. Consequently, the third rotary module RM3 is reversely rotated at a speed that is indicated by "R2" in the collinear chart of FIG. 2, while the transmission 10 is being placed in the second rear drive position (R2). The first and second rear drive positions may be referred also to as a first-speed position and a second-speed position of the rear drive, respectively.

FIG. 3 is a table indicating the operating states of the respective clutches C1-C4 and brakes B1, B2 in each of the above-described drive positions, and the speed ratio of each of the drive positions. In the table of FIG. 3, "○" (circle) indicates the engaged state of each of the frictional coupling devices, while blank (absence of the circle) indicates the released state of each frictional coupling device. The speed ratio of each drive position is dependent on the gear ratios $\rho_1$, $\rho_2$, $\rho_3$ of the respective first, second and third planetary gear sets 18, 22, 24. Where the gear ratios $\rho_1$, $\rho_2$, $\rho_3$ are 0.463, 0.463 and 0.415, respectively ($\rho_1$=0.463, $\rho_2$=0.463, $\rho_3$=0.415), the drives position are given respective speed ratios which provide appropriate ratio steps between adjacent drive positions and also a ratio spread that is as large as about 6.578 (=4.532/0.667). Further, the first and second rear drive positions (R1, R2) are given appropriate speed ratios. It is therefore possible to obtain an appropriate characteristic regarding the speed ratios.

As described above, the transmission 10 constructed to be capable of establishing the eight forward drive positions, by selectively engaging and releasing the four clutches C1-C4 and the two brakes B1, B2. The transmission 10 can be made compact in size so as to be installable on a vehicle with a high degree of freedom, owing to its simple construction in which the first transmission unit 20 is constituted principally by the two intermediate transmitting paths PA1, PA2 having the respective different speed ratios while the second transmission unit 26 is constituted principally by the two planetary gear sets 22, 24. Further, as described above, the transmission 10 provides a wide range of speed ratio and appropriate ratio steps between adjacent drive positions. Still further, as is apparent from the table of FIG. 3, each of the drive potions can be established by simply engaging corresponding two of the four clutches C1-C4 and two brakes B1, B2. This arrangement permits easier control of the shifting action of the transmission 10, and makes it possible to restrain a shock caused by the shifting action.

Figure 4:
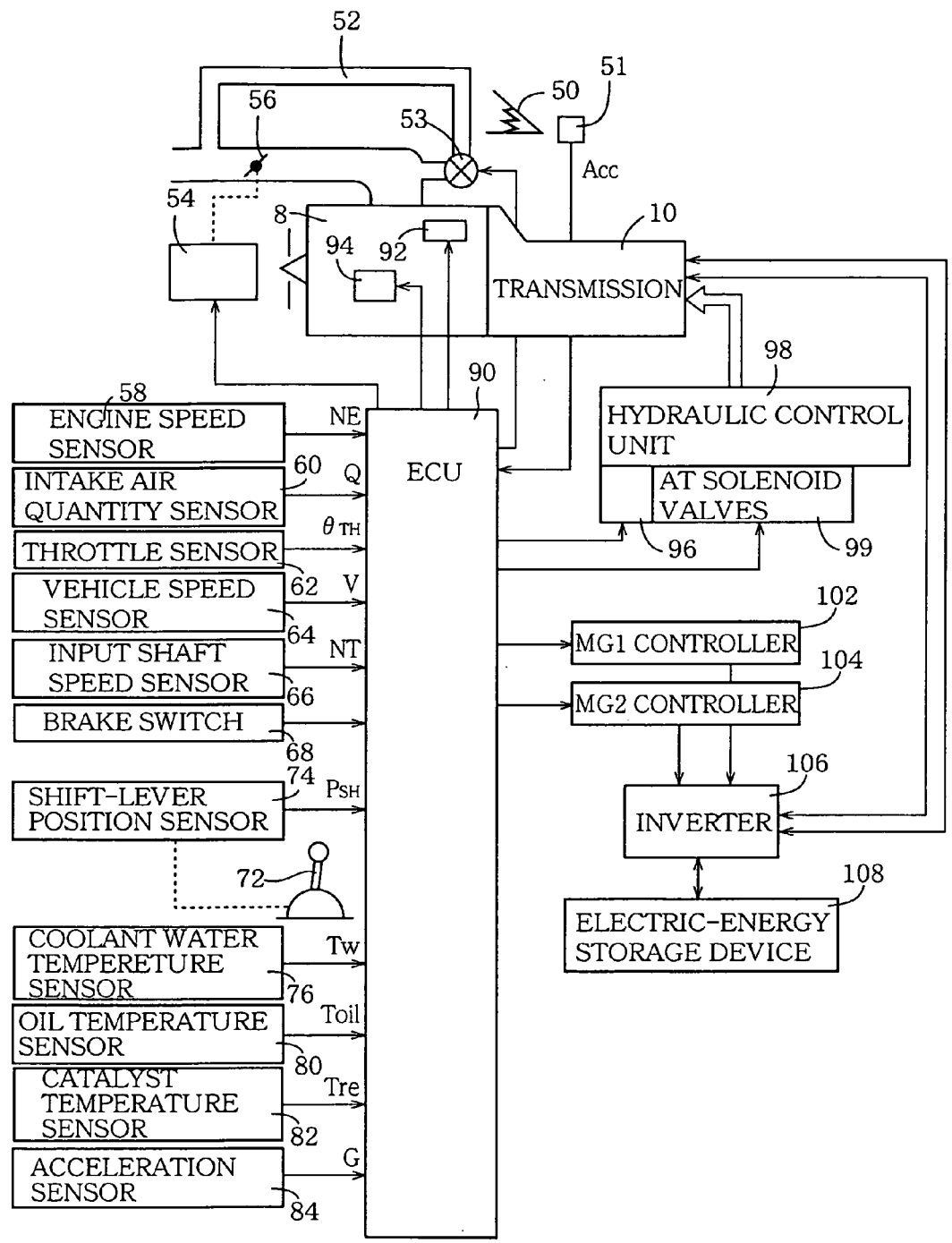
FIG. 4 is a block diagram showing a control system including the control apparatus in the form of an electronic control unit (ECU) which is constructed according to a first embodiment of the invention.

FIG. 4 is a block diagram showing a control system for controlling the engine 8, clutch Ci, automatic transmission 10 and motor/generators MG1, MG2 (each of which also severs as a drive power source as the engine 8). The control system includes an electronic control unit (ECU) 90 which is constructed according to a first embodiment of the invention. The ECU 90 is arranged to receive output signals of various sensors which include an accelerator pedal sensor 51, an engine speed sensor 58, an intake air quantity sensor 60, a throttle sensor 62, a vehicle speed sensor 64, an input shaft speed sensor 66, a brake switch 68, a shift-lever position sensor 74, a coolant water temperature sensor 76, an oil temperature sensor 80, a catalyst temperature sensor 82 and an acceleration sensor 84. The accelerator pedal sensor 51 is provided to detect an operating amount or angle Acc of an accelerator operating member in the form of an accelerator pedal 50 which is to be depressed by the amount corresponding to an operator's required output. An electronic throttle valve 56 is disposed within an intake pipe of the engine 8, and is actuated by a throttle actuator 54 such that an opening angle $\theta_{TH}$ of the throttle valve 56 corresponds to the operating angle Acc of the accelerator pedal 50. An ISC (Idle Speed Control) valve 53 is disposed within a by-pass passage 52 by-passing the throttle valve 56, for controlling an idle speed $NE_{IDL}$ of the engine 8. That is, the ISC valve 53 is operated to control an amount of intake while the throttle valve 56 is being fully closed, so as to control the idle speed $NE_{IDL}$ of the engine 8. The engine speed sensor 58 is provided to detect a rotational speed NE of the engine 8, i.e., a rotational speed of the first motor/generator MG1 (hereinafter referred to as "MG1"). The intake air quantity sensor 60 is provided to detect an intake air quantity Q of the engine 8. The throttle sensor 62 is provided to detect an opening angle $\theta_{TH}$ of the throttle valve 56. This throttle sensor 62 includes an idle switch for detecting a fully closed state of the throttle valve 56. The vehicle speed sensor 64 is provided to detect a rotational speed Nout of the output shaft 28 of the transmission 10, i.e., a running speed V of the vehicle. The input shaft speed sensor 66 is provided to detect a rotational speed Nin of the input shaft 16 of the transmission 10, i.e., a rotational speed of the second motor/generator MG2 (hereinafter referred to as "MG2"). The brake switch 68 is provided to detect an operation of a foot brake as a service brake. The shift-lever position sensor 74 is provided to detect a currently selected operating position $P_{SH}$ of a shift lever 72. The coolant water temperature sensor 76 is provided to detect a temperature Tw of a coolant water in the engine 8. The oil temperature sensor 80 is provided to detect a temperature Toil of a working fluid in the transmission 10. The catalyst temperature sensor 82 is provided to detect a temperature Tre of a catalyst used for cleaning an exhaust gas. The acceleration sensor 84 is provided to detect an acceleration G of the vehicle.

The ECU 90 receives, from the above-described sensors and switches, the signals representative of the rotational speed NE of the engine 8, the intake air quantity Q of the engine 8, the opening angle $\theta_{TH}$ of the throttle valve 56, the running speed V of the vehicle, the rotational speed Nin of the input shaft 16, whether the braking operation is being currently effected or not, the operating position $P_{SH}$ of the shift lever 72, the temperature Tw of the coolant water in the engine 8, the temperature Toil of the working fluid in the transmission 10, the temperature Tre of the catalyst, and the acceleration G of the vehicle. The ECU 90 includes a so-called microcomputer incorporating a central processing unit (CPU), a read-only memory (ROM), a random-access memory (RAM), and an input-output interface. The CPU effects signal processing operations according to control programs stored in the ROM, while utilizing a temporary data storage function of the RAM, for executing various control routines such as: an engine-output control routine for controlling the output of the engine 8; a transmission shift control routine for controlling the shifting actions of the transmission 10; a shock-absorbing control routine for absorbing the shock upon completion of the shifting action of the transmission 10; and a hybrid drive control routine for controlling the MG1, MG2 each of which is placed in its power running state or regenerative braking state. In this respect, the CPU of the ECU 90 is sectioned into an engine control portion, a shifting-action control portion, a hybrid-drive control portion and other portion.

Figure 5:
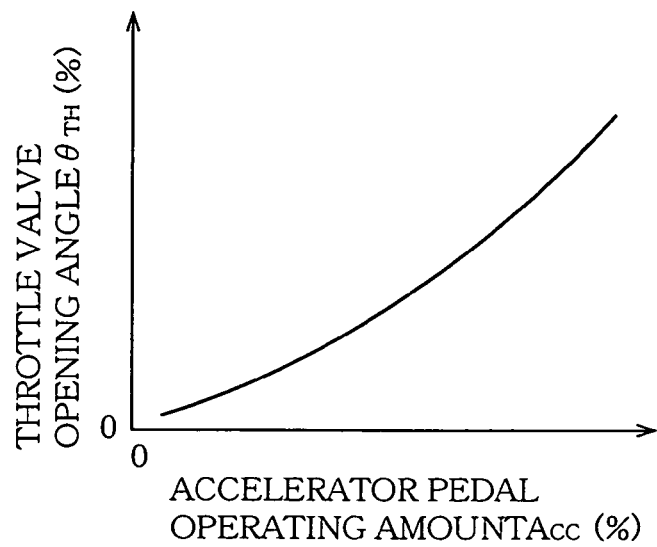
FIG. 5 is a graph indicating a relationship between an operating amount $\theta_{ACC}$ of an accelerator pedal and an opening angle $\theta_{TH}$ of a throttle valve which is actuated by a throttle actuator controlled by the ECU of FIG. 4.

In the engine-output routine executed by the ECU 90, the output of the engine 8 is controlled by the electronic throttle valve 56 opened and closed by the throttle actuator 54, and also by a fuel injector device 92 operable to control an amount of fuel injection into the engine 8, an igniter device 94 operable to control an ignition timing of the engine 8, and the ISC valve 53 operable to control the engine idle speed. The opening angle $\theta_{TH}$ of the electronic throttle valve 56 is controlled by the throttle actuator 54, which is controlled on the basis of the detected operating amount Acc of the accelerator pedal 50, and according to a predetermined relationship between the accelerator operating amount Acc and the throttle opening angle $\theta_{TH}$ (see FIG. 5), such that the opening angle $\theta_{TH}$ is increased with an increase in the accelerator operating amount Acc. When the engine 8 is started, the clutch Ci is placed in its released state, for permitting the crankshaft 9 of the engine 8 to be cranked up by the MG1 activated as an electric motor.

Figure 6:
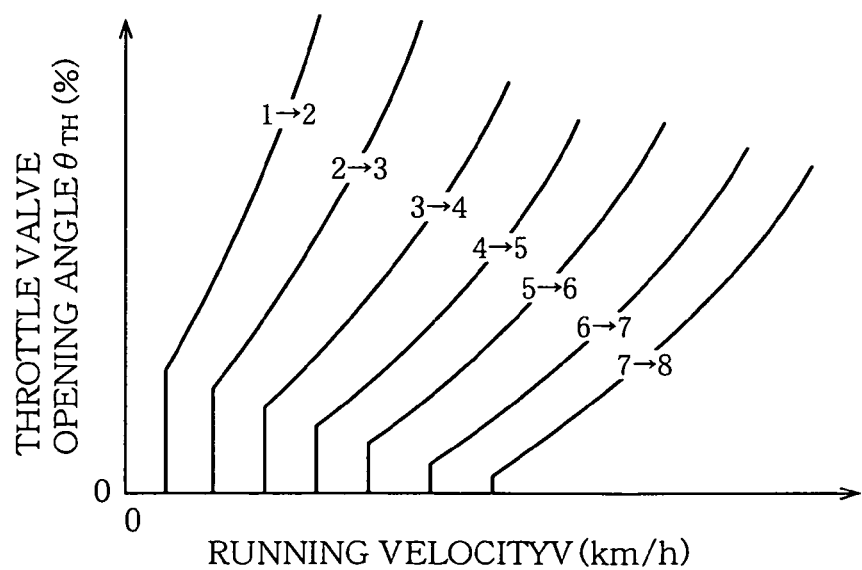
FIG. 6 is a graph showing shift patterns for shifting the automatic transmission, which shift patterns are stored in a ROM of the ECU of FIG. 4.

In the transmission shift control routine executed by the ECU 90, it is determined whether the transmission 10 should be shifted down or up, on the basis of the detected opening angle $\theta_{TH}$ (%) of the throttle valve 56 and the detected vehicle running speed V, and according to a shift control data map (shift boundary lines as shown in FIG. 6) which is stored in the ROM of the ECU 90. Namely, the determination is made as to whether a vehicle running condition defined by the detected values $\theta_{TH}$ and V has moved across any one of the shift boundary lines. When any shift-up or shift-down action of the automatic transmission 16 is determined to be required, a hydraulic control unit 98 is controlled to effect the required shift-up or shift-down action, so that AT solenoid valves 99 of the hydraulic control unit 98 are suitably controlled (with their solenoid coils being suitably energized or de-energized to suitably position their spools), so as to establish an appropriate combination of the operating states of the above-described clutches C1-C4 and brakes B1, B2, which combination corresponds to a selected one of the speed positions and neutral position N. It is noted that a clutch control valve 96 provided in the hydraulic control unit 98 is controlled such that the clutch Ci is held in its engaged state during execution of the transmission shift control routine, at least where the transmission shift control routine is executed during a so-called "power-on running" of the vehicle, i.e., during acceleration of the vehicle with the accelerator pedal 50 being depressed.

The ECU 90 includes a transmission shift controller 110 which is assigned to execute the above-described transmission shift control routine, on the basis of the opening angle $\theta_{TH}$ (%) of the throttle valve 56 and the vehicle running speed V as parameters, according to the predetermined shift control data map (shift boundary lines as shown in FIG. 6). The shift control data map is formulated such that the transmission 10 is shifted down to increase its speed ratio Nin/Nout, when the vehicle running speed V is lowered or when the throttle opening angle $\theta_{TH}$ is increased. Further, in the transmission shift control routine, the hydraulic pressure of each of the clutches C1-C4 and brakes B1, B2 is finely controlled by an AT line-pressure control solenoid and a linear solenoid valve SLT, when it is switched from its engaged state into its released state or vice versa, so that the shifting action can be made smoothly. It is noted that shift-down boundary lines are not indicated in the shift control data map of FIG. 6 while shift-up boundary lines are indicated in the data map.

Figure 7:
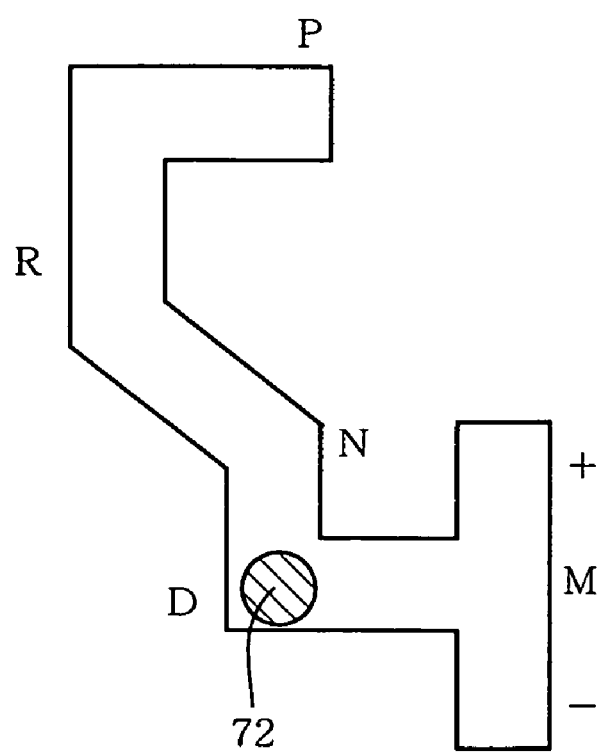
FIG. 7 is a view indicating operating positions of the shift lever of FIG. 4.

The shift lever 72 is manually operable to a selected one of positions indicated in FIG. 7: a parking position P selected to cut off a power transmitting path between the drive power source (i.e., the engine 8, MG1, MG2) and the drive wheels, and to lock a rotation of the output shaft 28 of the transmission 10; a reverse position R selected to cause the output shaft 28 to be rotated in the reverse direction; a neutral position N selected to cut off the power transmitting path; a drive position D selected to establish an automatic shifting mode in which the automatic transmission 16 is automatically shifted to one of the eight forward-drive positions (1st through 8th) to drive the vehicle in the forward direction; and a manual position M selected to establish a manual shifting mode. In the manual shifting mode, one of shift ranges or one of the forward-drive positions can be established by sequentially operating the shift lever 72 in the shift-up or shift-down direction to a shift-up position (+) or a shift-down position (−). The transmission 10 is shifted up each time the shift lever 72 is shifted to the shift-up position (+), while being shifted down each time the shift lever 72 is shifted to the shift-down position (−). As described above, the currently selected one of the positions P, R, N, D, M is detected by the shift-lever position sensor 74. In the transmission shift control routine executed by the ECU 90, the shift range or the drive position established in the transmission 10 is changed in response to the manual operation effected in the manual shifting mode.

During the shifting action, the rotational speed of the engine 8 is changed at a predetermined rate, from a value before the shifting action to a value after the shifting action. When the rotational speed of the engine 8 becomes equalized to a synchronous speed corresponding to the changed speed ratio of the transmission 10, the change of the rotational speed of the engine 8 is quickly stopped so that the rotational speed is forcedly kept to be equalized to the synchronous speed. In this instance, the quick stop of the change of the engine speed induces an elastically torsional vibration in the power transmitting path, thereby causing a shift shock. The elastically torsional vibration is not so notable where a fluid-operated power transmitting device such as a fluid-operated torque converter is disposed in the power transmitting path. However, such a torsional vibration is notable in the power transmitting path as shown in FIG. 1 in which the crankshaft 9 and the input shaft 16 are coupled to each other through a mechanical element such as the clutch Ci. In the shock-absorbing control routine executed by the ECU 90, the MG1 and/or MG2 is controlled to generate a torque vibration which is inverted to the torsional vibration in phase. In addition to the generation of the inverted-phase torque vibration as a restraining torque, an additional routine such as an output-torque reduction routine and a clutch control routine is executed as needed. In the output-torque reduction routine, an output torque of the engine 8 is reduced by retarding an ignition timing of the engine 8 during the shifting action. In the clutch control routine, the clutch Ci is placed in its fully released state or its slipping state upon completion of the shifting action.

In the hybrid drive control routine executed by the ECU 90, the operating states of the clutch Ci and motor/generators MG1, MG2 are controlled so as to establish one of operating modes of the vehicle (such as a motor drive mode, an engine drive mode, a motor/engine drive mode and a regenerative braking mode) which one is selected on the basis of a running condition of the vehicle. For example, in the motor drive mode for enabling the vehicle to start or run with a high degree of silence, a MG2 controller 104 controls an inverter 106 such that an electric energy is supplied to the MG2 from an electric-energy storage device 108 through the inverter 106, while the clutch control valve 98 of the hydraulic control unit 96 is controlled such that the clutch Ci is held in its released state. In the engine drive mode, the clutch control valve 98 is controlled such that the clutch Ci is held in its engaged state so that the output of the engine 8 is transmitted to the input shaft 16 of the transmission 10 through the clutch Ci, while the MG1 or MG2 is controlled by a MG1 controller 102 or MG2 controller 104 to be placed in its charging state for generating the electric energy so that the generated electric energy is stored in the electric-energy storage device 108. Thus, the vehicle can be driven by the MG1 or MG2 even after an amount of the electric energy stored in the electric-energy storage device 108 has once become small. In the motor/engine drive mode, the output of the MG1 and/or MG2, as well as the output of the engine 8, is transmitted to the input shaft 16 of the transmission 10 through the clutch Ci which is held in its engaged state, for enabling the vehicle to accelerated. In the regenerative braking mode which is established in order to obtain a sufficient amount of braking force during a braking application to the vehicle with an operation of a brake pedal or during a coasting of the vehicle, the MG2 is controlled by the MG2 controller 104 to be placed in its charging state, the braking force is provided by a regenerative torque consumed for the generation of the electric energy, while the generated electric energy is stored in the electric-energy storage device 108 through the inverter 106.

Figure 8:
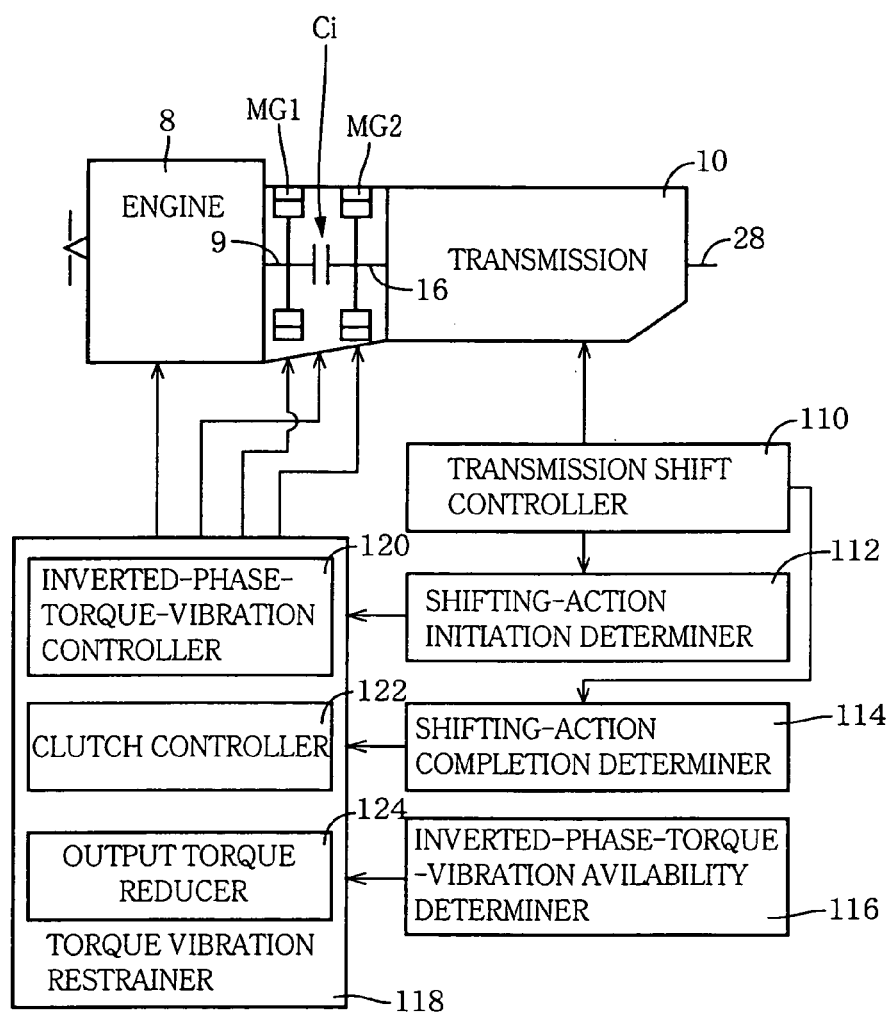
FIG. 8 is a block diagram showing various functional means incorporated in the ECU of FIG. 4.

FIG. 8 is a block diagram showing a portion of the ECU 90 which is assigned to the execution of the shock-absorbing control routine. The transmission shift controller 110 determines whether the transmission 10 should be shifted down or up, on the basis of the actual opening angle $\theta_{TH}$ (%) of the throttle valve 56 and the actual vehicle running speed V, and according to the shift control data map (as shown in FIG. 6) which is stored in the ROM of the ECU 90, and then transmits a shift command signal to the hydraulic control unit 98 if any shift-up or shift-down action of the transmission 10 is determined to be required, so that the required shift-up or shift-down action is automatically effected in the transmission 10. For example, in a 2-3 shift-up action of the transmission 10 from the 2nd-speed position to the 3rd-speed position, a releasing action of the brake B1 is first initiated, and then an engaging action of the clutch C3 is initiated while an engaging torque of the brake B1 is being still somewhat maintained. That is, in a transition of the speed ratio of the transmission 10 from that $\gamma_2$ of the 2nd-speed position to that $\gamma_3$ of the 3rd-speed position, there is a stage in which the brake B1 and the clutch C3 have the respective engaging torques. The shift-action is completed when the releasing action of the brake B1 and the engaging action of the clutch C3 are both completed.

The ECU 90 further includes a shifting-action initiation detector or determiner 112 and a shifting-action completion detector or determiner 114 which are assigned to detect an initiation and a completion of a shifting action of the transmission 10, respectively. Described specifically, the shifting-action initiation determiner 112 determines whether the shifting action in accordance with the transmission shift control routine by the transmission shift controller 110 has been initiated or not, depending upon whether the shift command signal has been outputted from the transmission shift controller 110. The shifting-action initiation determiner 112 determines that the shifting action is initiated when the shift command signal is detected. In each of time charts of FIGS. 9 and 10, "$t_1$" indicates a point of time at which the shift command signal is outputted. The shifting-action completion determiner 114 determines that the shifting action has been completed or not, depending upon whether the rotational speed Nin of the input shaft 16 of the transmission 10 has been changed from a value corresponding to a drive position before the shifting action, to a value corresponding to a speed position to which the transmission 10 is shifted as a result of the shifting action, or whether the rotational speed Nin of the input shaft 16 has become equalized to a synchronous rotational speed (i.e., a product of a rotational speed Nout of the output shaft 28 of the transmission 10 and a newly established speed ratio of the transmission 10 which is established as a result of the shifting action). Further, the shifting-action completion determiner 114 also determines that the shifting action has been almost completed or not, depending upon whether the rotational speed Nin of the input shaft 16 has been almost equalized or become close to the synchronous rotational speed. Specifically, in the 2-3 shift-up action shown in FIG. 9, it is detected at a point of time $t_5$ that the rotational speed Nin of the input shaft 16 has been reduced to be equalized to a synchronous rotational speed corresponding to the 3rd-speed position, i.e., a product of the rotational speed Nout of the output shaft 28 of the transmission 10 and the speed ratio $\gamma_3$ of the 3rd-speed position (=rotational speed Nout×speed ratio $\gamma_3$), and also detected at a point of time $t_4$ that the rotational speed Nin of the input shaft 16 has come down to be almost equal to the synchronous rotational speed. In the 3-2 shift-down action shown in FIG. 10, it is detected at a point of time $t_5$ that the rotational speed Nin of the input shaft 16 has been increased to be equalized to a synchronous rotational speed corresponding to the 2nd-speed position, i.e., a product of the rotational speed Nout of the output shaft 28 of the transmission 10 and the speed ratio $\gamma_2$ of the 2nd-speed position (=rotational speed Nout×speed ratio $\gamma_2$), and also detected at a point of time $t_4$ that the rotational speed Nin of the input shaft 16 has almost come up to be equal to the synchronous rotational speed.

The ECU 90 includes an inverted-phase-torque-vibration availability determiner 116 operable to determine whether application of an inverted-phase torque vibration to the power transmitting path by a torque vibration restrainer 118 of the ECU 90 can be made for restraining the torque vibration generated in the power transmitting path upon completion of the shifting action. This determination can be made, for example, on the basis of an operating condition of each of the electric motor (MG1, MG2) for outputting the inverted-phase torque vibration, a temperature of the electric motor, and an amount of the electric energy stored in the electric-energy storage device 108 which supplies the electric energy to the electric motor. In this arrangement, the inverted-phase-torque-vibration availability determiner 116 determines that the application of the inverted-phase torque vibration can not be made, for example, if a failure of the electric motor is detected, the temperature of the electric motor is higher than a threshold, or the stored amount of the electric energy is smaller than a threshold.

The torque vibration restrainer 118 is provided for restraining the torque vibration which is generated in the power transmitting path in a final stage of the shifting action or immediately after the shifting action, as a result of a quick stop of the change of the rotational speed of the engine 8. Specifically, the torque vibration restrainer 118 principally functions to cause the MG1 or MG2 to generate the inverted-phase torque vibration which is inverted in phase with respect to the generated torque vibration, for offsetting the generated torque vibration. Additionally, the torque vibration restrainer 118 causes the clutch Ci to be placed in its released state or slipping state, and/or causes the output of the engine 8 to be temporarily reduced, for thereby restraining the torque vibration. The torque vibration is represented by a pulsation which is indicated by broken line in each of FIGS. 9 and 10.

Figure 9:
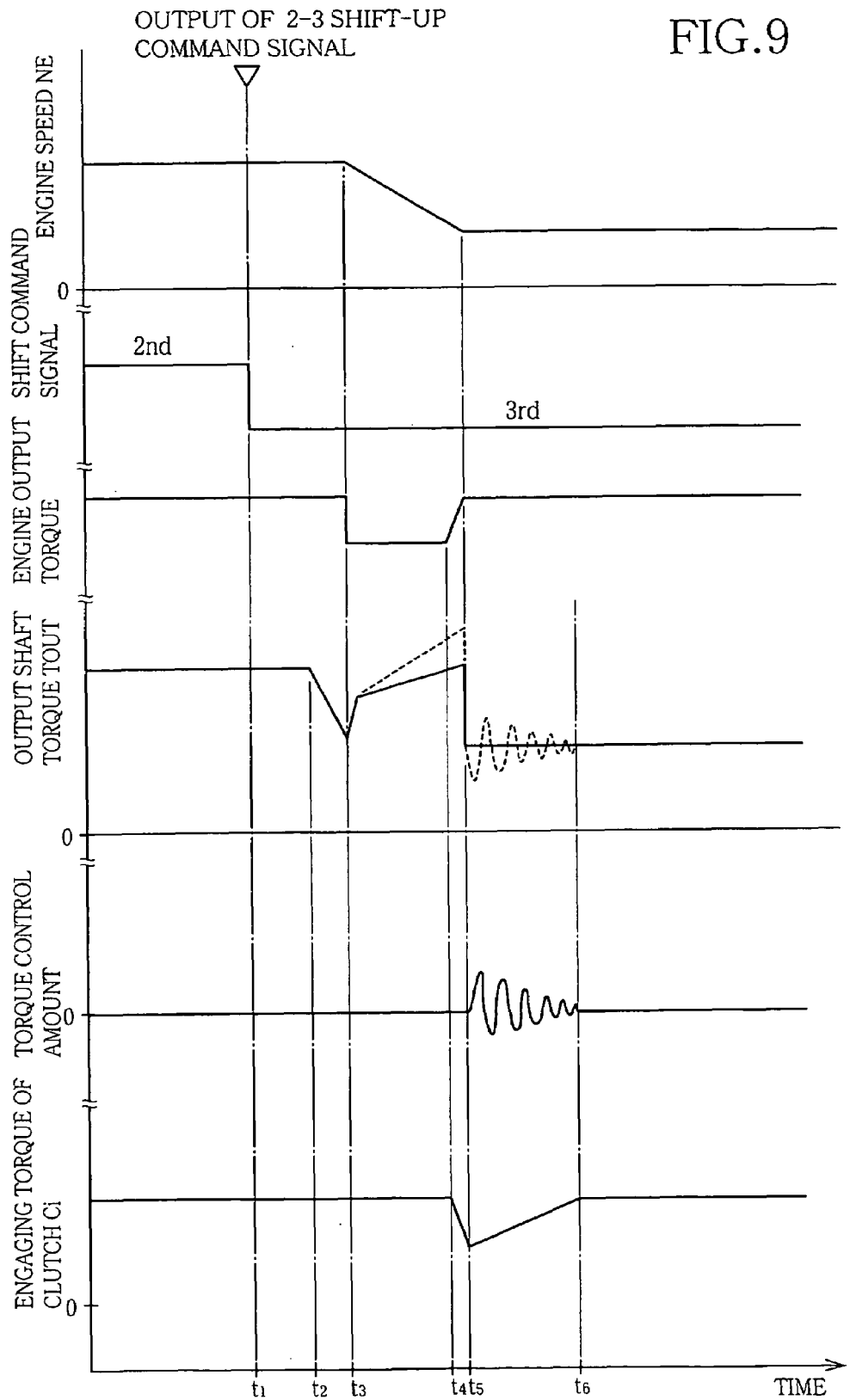
FIG. 9 is a time chart for explaining operations of the ECU of FIG. 4 when the transmission is shifted up from its second-speed position to third-speed position.
Figure 10:
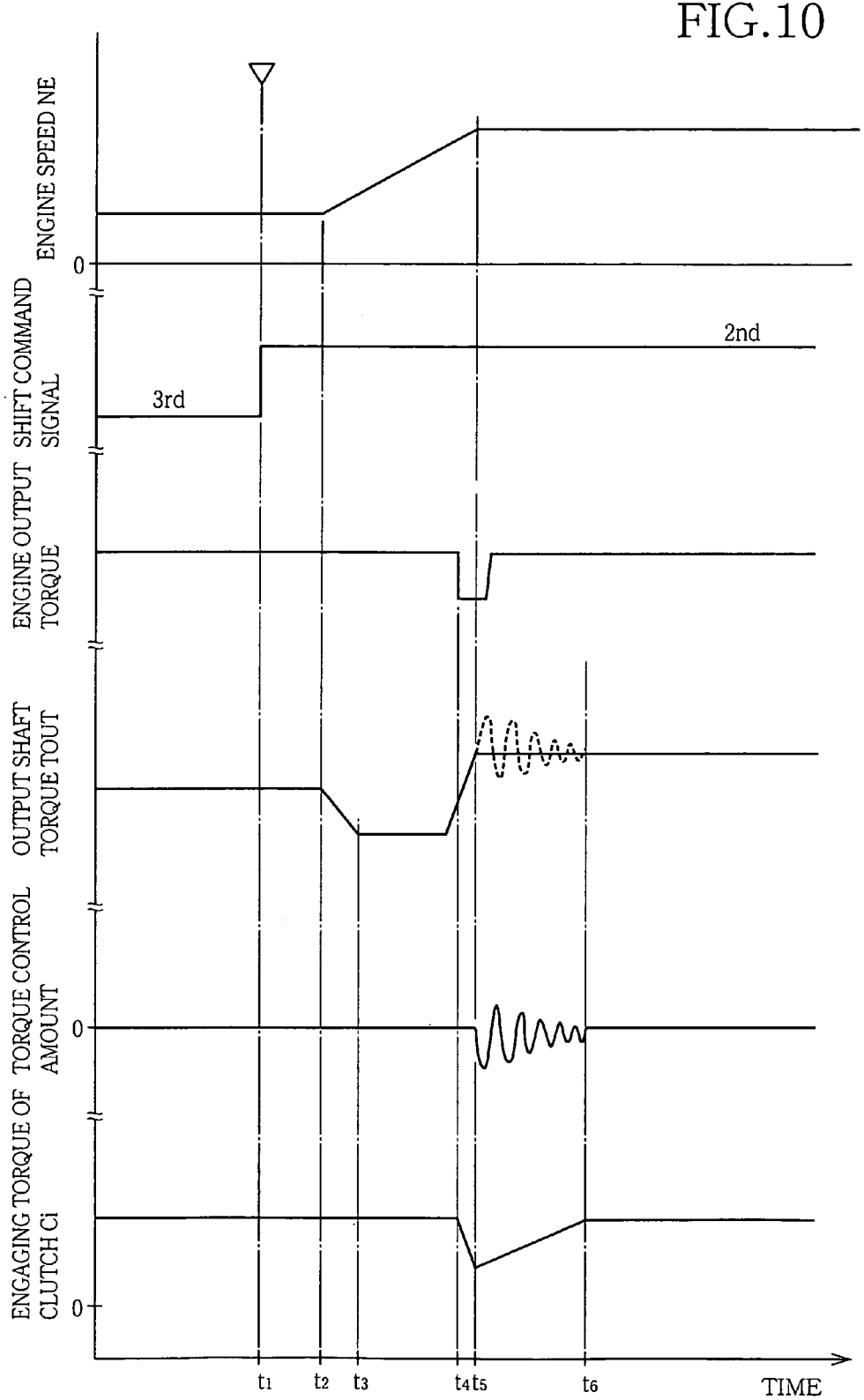
FIG. 10 is a time chart for explaining operations of the ECU of FIG. 4 when the transmission is shifted down from its third-speed position to second-speed position.
Figure 11:
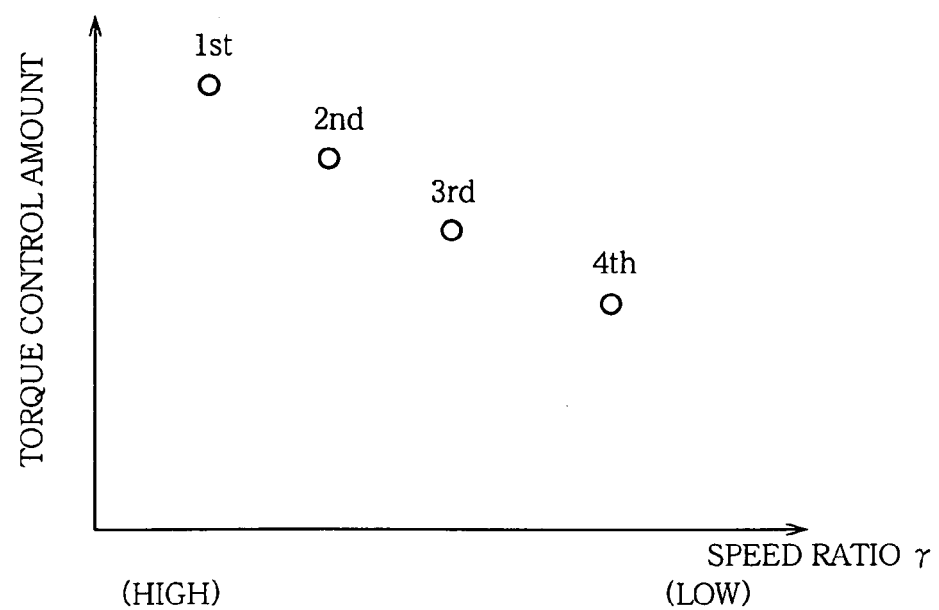
FIG. 11 is a graph showing a relationship (data map) which is used in determination made by an inverted-phase-torque-vibration controller of FIG. 8, for determining a torque control amount on the basis of a speed ratio established in the transmission.

The torque vibration restrainer 118 includes an inverted-phase-torque-vibration controller 120, a clutch controller 122 and an output torque reducer 124. The inverted-phase-torque-vibration controller 120 is operated, upon determination made by the shifting-action completion determiner 114 that the shifting action has been completed or almost completed, to estimate or determine the amplitude of the torque vibration generated as a result of a behavior of the engine 8 in which the rotational speed NE is forcedly kept to be equal to the synchronous speed, and also the amplitude of the inverted-phase torque vibration that is to be outputted from the MG1 or MG2. The inverted-phase-torque-vibration controller 120 determines the amplitude of the generated torque vibration and that of the inverted-phase torque vibration, according to a relationship in the form of a data map (as shown in FIG. 11) which is stored in the ROM of the ECU 90, on the basis of the speed ratio γ which is established in the transmission 10 before or after the shifting action. Then, the inverted-phase-torque-vibration controller 120 causes the MG1 or MG2 to output the inverted-phase torque vibration having the determined amplitude, to the power transmitting path in a time period between points of time $t_5$ and $t_6$, as shown in FIGS. 9 and 10. It is noted that the torque vibration generated in the power transmitting path upon completion of the shifting action has characteristics which are proper to the power transmitting path of the vehicle in question, so that a frequency, a damping factor and other characteristics of the generated torque vibration can be obtained in an experiment which is conducted in advance. The thus obtained characteristics can be stored as data in the ROM of the ECU 90, so that the inverted-phase torque vibration outputted from the MG1 or MG2 can be adapted to have a waveform which is inverted in phase with respect to that of the generated torque vibration and which is identical in frequency and damping factor with that of the generated torque vibration. The above-described amplitude of the inverted-phase torque vibration corresponds to a torque control amount of the inverted-phase-torque-vibration controller 120 which is represented by a vertical axis of the graph of FIG. 11, and precisely indicates an amplitude of a first wave of the inverted-phase torque vibration. As is apparent from FIG. 11, the torque control amount is reduced with a reduction of the speed ratio γ.

Figure 12:
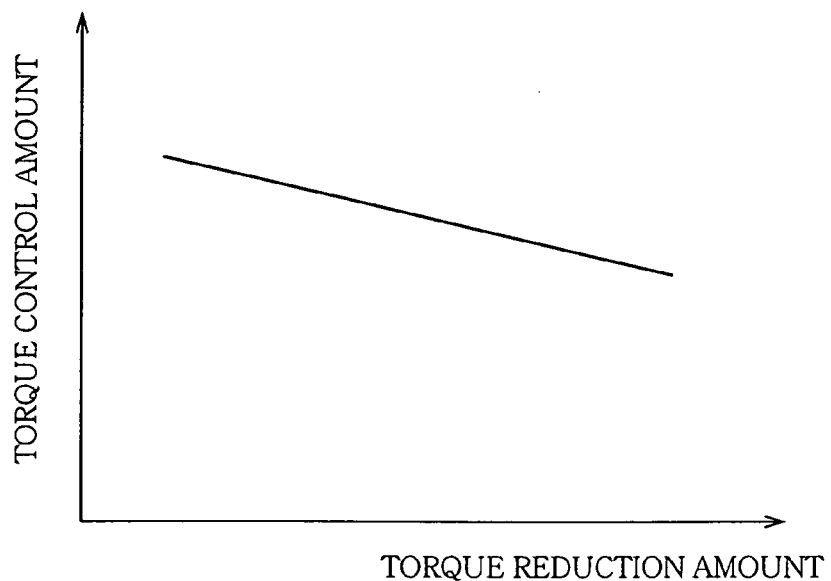
FIG. 12 is a graph showing a relationship (data map) which is used in determination made by an inverted-phase-torque-vibration controller of FIG. 8, for determining a torque control amount on the basis of a reduction amount by which an output torque of an engine is reduced by an output torque reducer of FIG. 8.

Further, the inverted-phase-torque-vibration controller 120 determines the torque control amount, according to a relationship in the form of a data map (as shown in FIG. 12) which is stored in the ROM of the ECU 90, on the basis of the reduction amount by which the output torque of the engine 8 is temporarily reduced by the output torque reducer 124. Then, the inverted-phase-torque-vibration controller 120 causes the MG1 or MG2 to output the inverted-phase torque vibration having the determined torque control amount, i.e., the determined amplitude, to the power transmitting path.

Figure 13:
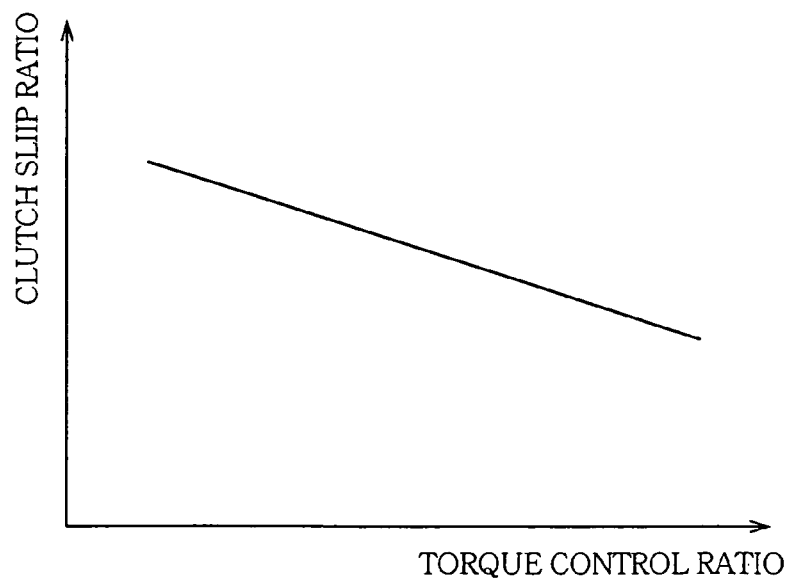
FIG. 13 is a graph showing a relationship (data map) which is used in determination made by a clutch controller of FIG. 8, for determining a clutch slip ratio on the basis of a torque control ratio.

The clutch controller 122 determines a clutch slip ratio, according to a relationship in the form of a data map (as shown in FIG. 13) which is stored in the ROM of the ECU 90, on the basis of an actual torque control ratio (%). Then, the clutch controller 122 causes the engaging torque of the clutch Ci to be reduced such that the clutch Ci exhibits the determined slip ratio. The reduction of the engaging torque of the clutch Ci is made temporarily in a stage in which the inverted-phase torque vibration is being applied to the power transmitting path by the inverted-phase-torque-vibration controller 120, namely, in a time period between the point of time $t_4$. (at which the rotational speed Nin of the input shaft 16 is almost equalized to the synchronous rotational speed) and a point of time $t_6$ (at which the application of the inverted-phase torque vibration is terminated). It is noted that the above-described torque control ratio is defined as a ratio (%) of a part of the entire torque control amount which part is obtainable from other means, with respect to the entire torque control amount which is required to sufficiently restrain the torque vibration. As the part of the torque control amount obtainable from the other means, there are an amount of reduction of the torque of the engine 8 which reduction is made by retarding an ignition timing of the engine 8, and an amount of the torque which is given to the MG1 or MG2 for reducing an inertia torque of the engine 8. As is apparent from FIG. 13, the slip ratio as a target value is increased with a reduction of the torque control ratio, while being reduced with an increase of the torque control ratio.

The output torque reducer 124 temporarily reduces the output torque of the engine 8, for example, by retarding the ignition timing of the engine 8, by reducing the opening angle $\theta_{TH}$ of the throttle valve 56, and/or by limiting a fuel injection amount, so as to restrain the amplitude of the torque vibration generated in the power transmitting path upon completion of the shifting action. It is noted that the temporal reduction of the output torque of the engine 8 is made in an inertia phase of the shifting action where the transmission 10 is shifted up (see FIG. 9), while it is made in a final stage of the inertia phase of the shifting action where the transmission 10 is shifted down (see FIG. 10).

Figure 14:
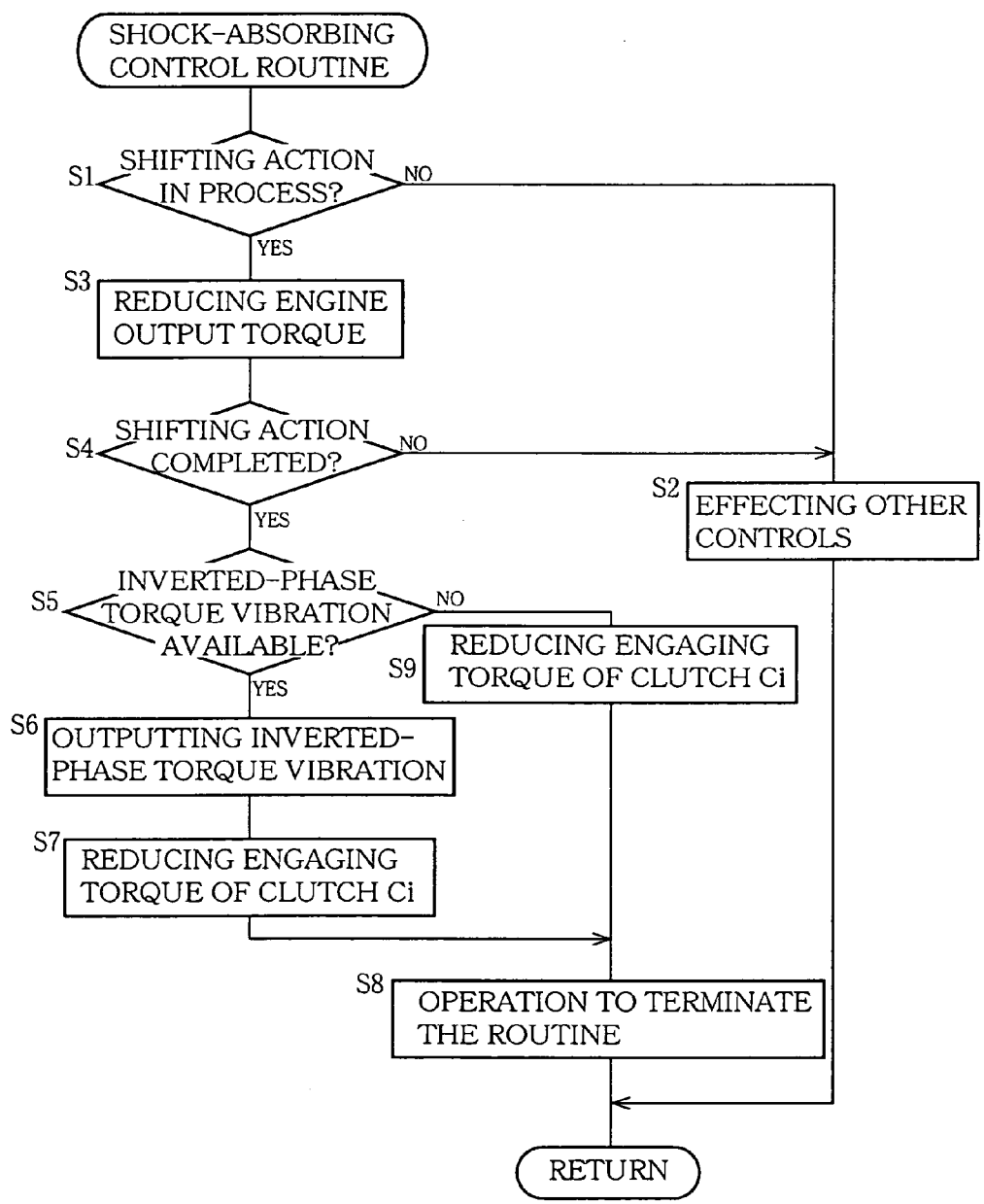
FIG. 14 is a flow chart illustrating a shock-absorbing control routine which is one of control routines executed by the ECU of FIG. 4.
Figure 15:
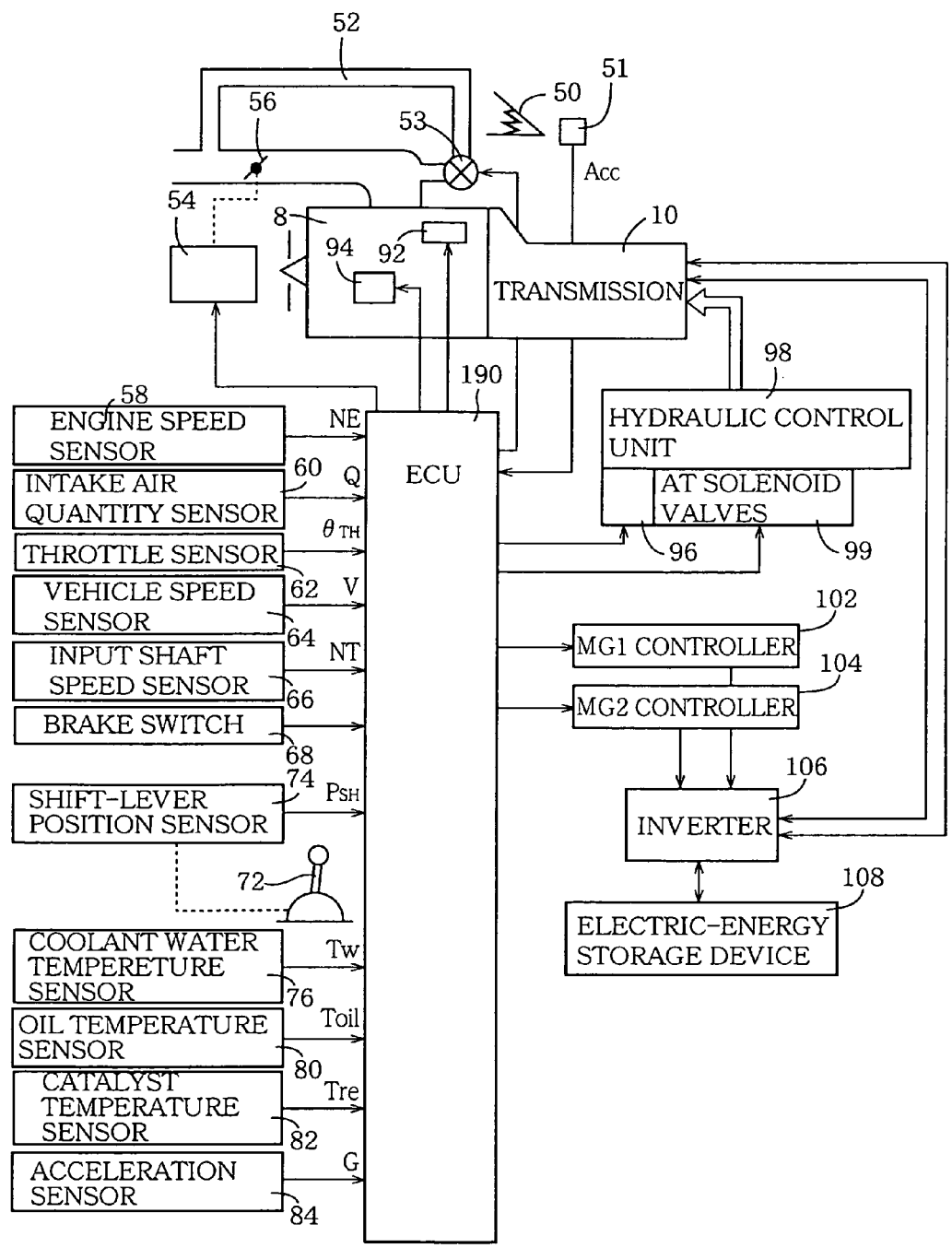
FIG. 15 is a block diagram showing a control system including the control apparatus in the form of an electronic control unit (ECU) which is constructed according to a second embodiment of the invention.

Referring next to the flow chart of FIG. 14, there will be described in detail the shock-absorbing control routine which is executed by the ECU 90, with a predetermined cycle time.

The routine is initiated with step S1 which is implemented by the shifting-action initiation determiner 112, to determine whether a shifting action of the transmission 10 is being in its process or not. If a negative decision (NO) is obtained in step S1, one cycle of execution of the control routine is terminated after other controls have been effected in step S2. If an affirmative decision (YES) is obtained in step S1, the control flow goes to step S3 which is implemented by the output torque reducer 124, to temporarily reduce the output torque of the engine 8. As described above, the temporal reduction of the output torque of the engine 8 is made throughout the inertia phase in which the rotational speed NE of the engine 8 is changed, where the transmission 10 is shifted up, as shown in FIG. 9. The temporal reduction of the output torque of the engine 8 is made in the final stage of the inertia phase, where the transmission 10 is shifted down, as shown in FIG. 10.

Step S3 is followed by step S4 which is implemented by the shifting-action completion determiner 114, to determine whether the shifting action has been completed or not, depending upon whether or not the rotational speed NE of the engine 8 has been equalized to a synchronous rotational speed corresponding to a drive position to which the transmission 10 has been shifted as a result of the shifting action. If a negative decision (NO) is obtained in step S4, one cycle of execution of the control routine is terminated after other controls have been effected in step S2. If an affirmative decision (YES) is obtained in step S4, the control flow goes to step S5 which is implemented by the inverted-phase-torque-vibration availability determiner 116, to determine whether or not the application of the inverted-phase torque vibration can be made for restraining the torque vibration generated upon completion of the shifting action, in view of an operating condition of each of the electric motor (MG1, MG2) for outputting the inverted-phase torque vibration, a temperature of the electric motor, and an amount of the electric energy remaining in the electric-energy storage device 108 which supplies the electric energy to the electric motor.

If an affirmative decision (YES) is obtained in step S5, the control flow goes to step S6 which is implemented by the inverted-phase-torque-vibration controller 120, to determine the amplitude of the torque vibration generated as a result of the behavior of the engine 8 in which the rotational speed NE is forcedly kept to be equal to the synchronous speed, and also the amplitude of the inverted-phase torque vibration that is to be outputted from the MG1 or MG2. The inverted-phase-torque-vibration controller 120 determines the amplitude of the generated torque vibration and that of the inverted-phase torque vibration, according to the data map of FIG. 11 which is stored in the ROM of the ECU 90, on the basis of the currently established speed ratio γ, and then causes the MG1 or MG2 to output the inverted-phase torque vibration having the determined amplitude, to the power transmitting path in the time period between the points of time $t_5$ and $t_6$, as shown in FIGS. 9 and 10. Concurrently with the implementation of step S6, step S7 is implemented by the clutch controller 122, to determine the clutch slip ratio, according to the data map of FIG. 13 which is stored in the ROM of the ECU 90, on the basis of the above-described actual torque control ratio, and then cause the engaging torque of the clutch Ci to be reduced such that the clutch Ci exhibits the determined slip ratio. The reduction of the engaging torque of the clutch Ci is made temporarily in the time period between the point of time $t_4$ (at which the rotational speed Nin of the input shaft 16 is almost equalized to the synchronous rotational speed) and the point of time $t_6$ (at which the application of the inverted-phase torque vibration is terminated). Then, one cycle of execution of the routine of FIG. 14 is completed with step S8 which is implemented to perform an operation to terminate the present shock-absorbing control routine.

If a negative decision (NO) is obtained in step S5, the control flow goes to step S9 in which the clutch slip ratio is determined by the clutch controller 122, such that the slip ratio is determined to be higher than where the ratio is determined in step S7. Then, in the stage in which the inverted-phase torque vibration is being applied to the power transmitting path, the engaging torque of the clutch Ci is temporarily reduced such that the clutch Ci exhibits the determined slip ratio. Step S9 is followed by step S8 to perform the operation to terminate the present shock-absorbing control routine.

As is clear from the above description, in the control apparatus in the form of the ECU 90 constructed according to the present first embodiment of the invention for controlling the stepped automatic transmission 10 having the input shaft 16 which is mechanically connected to the engine 8 while a shifting action is taking place in the transmission 10, the torque vibration restrainer 118 is provided to be operated, upon completion of the shifting action in the transmission 10, to reduce or restrain the torque vibration generated in the power transmitting path of the vehicle, thereby making it possible to minimize or reduce a shift shock caused by the torque vibration. The torque vibration restrainer 118 or the inverted-phase-torque-vibration controller 120 applies the inverted-phase torque vibration to the power transmitting path upon completion of the shifting action in the transmission, so that the torque vibration (generated in the power transmitting path as a result of a quick stop of the change of the rotational speed of the engine 8 which takes place upon completion of the shifting action) can be effectively counteracted or offset by the inverted-phase torque vibration which is inverted in phase with respect to the generated torque vibration. The generated torque vibration can be thus effectively offset by the inverted-phase torque vibration, thereby making it possible to reduce the shift shock caused by the torque vibration which is generated upon completion of the shifting action.

Further, the torque vibration restrainer 118 includes the inverted-phase-torque-vibration controller 120 which is operated to cause the MR1 or MR2 as the electric motor operatively connected to the input shaft 16 of the transmission 10, to output the inverted-phase torque vibration applied to the input shaft 16 of the transmission 10, so that the generated torque vibration can be effectively offset by the inverted-phase torque vibration outputted by the MR1 or MR2, whereby the shift shock caused by the torque vibration can be advantageously reduced.

Further, the torque vibration restrainer 118 includes the clutch controller 122 which is operated, upon completion of the shifting action in the transmission 10, to temporarily place the clutch Ci in its slipping state or released state, so that the generated torque vibration can be restrained by cooperation of the application of the inverted-phase torque vibration and the placement of the clutch Ci in the slipping sate or released state, whereby the shift shock caused by the torque vibration can be further reliably reduced.

Further, the inverted-phase-torque-vibration availability determiner 116 is further provided to determine whether or not the inverted-phase torque vibration is available to be applied to the power transmitting path upon completion of the shifting action. The clutch controller 122 of the torque vibration restrainer 118 is operated to temporarily place the clutch Ci in its slipping state or released state, in a case where it is determined by the inverted-phase-torque-vibration availability determiner 116 that the inverted-phase torque vibration is not available. This arrangement makes it possible to reduce the shift shock to some extent, by the placement of the clutch Ci in its slipping state or released state, in the case where the application of the inverted-phase torque vibration by the torque vibration restrainer 118 or the inverted-phase-torque-vibration controller 120 becomes impossible for some reason.

Further, the torque vibration restrainer 118 includes the output torque reducer 124 operated to temporarily reduce the output torque of the engine 8 in the final stage of the shifting action, and also the inverted-phase-torque-vibration controller 120 operated to change the amplitude of the inverted-phase torque vibration on the basis of the reduction amount by which the engine output torque is reduced by the output torque reducer 124. In this arrangement, since the torque vibration generated upon completion of the shifting action is reduced to some extent by the output torque reducer 124, it is possible to reduce a load on an inverted-phase torque vibration generator, such as the MG1 and MG2 operatively connected to the input shaft 16 of the transmission 10, which is operable to generate the inverted-phase torque vibration for offsetting the torque vibration generated upon completion of the shifting action.

Further, the torque vibration restrainer 118 includes the inverted-phase-torque-vibration controller 120 operable to change the amplitude of the inverted-phase torque vibration, according to the relationship shown in FIG. 11, on the basis of a currently selected one of drive positions of the transmission 10. Since the amplitude of the torque vibration generated upon completion of the shifting action varies depending upon the currently selected drive position of the transmission 10, the shift shock caused by the torque vibration can be further effectively reduced, by changing the amplitude of the inverted-phase torque vibration on the basis of the currently selected drive position of the transmission 10.

Referring next to FIGS. 9-13 and 15-18, there will be described an electronic control unit (ECU) 190 as the control apparatus which is constructed according to a second embodiment of the invention. In the following description as to the second embodiment, the same reference signs as used in the above-described first embodiment will be used to identify the functionally corresponding elements.

Like the above-described ECU 90 of the first embodiment of the invention, the ECU 190 of the present second embodiment includes a microcomputer incorporating CPU, ROM, RAM, and an input-output interface, and executes various control routines such as: an engine-output control routine for controlling the output of the engine 8; a transmission shift control routine for controlling the shifting actions of the transmission 10; a shock-absorbing control routine for absorbing the shock upon completion of the shifting action of the transmission 10; and a hybrid drive control routine for controlling the MG1, MG2 each of which is placed in its power running state or regenerative braking state.

Figure 16:
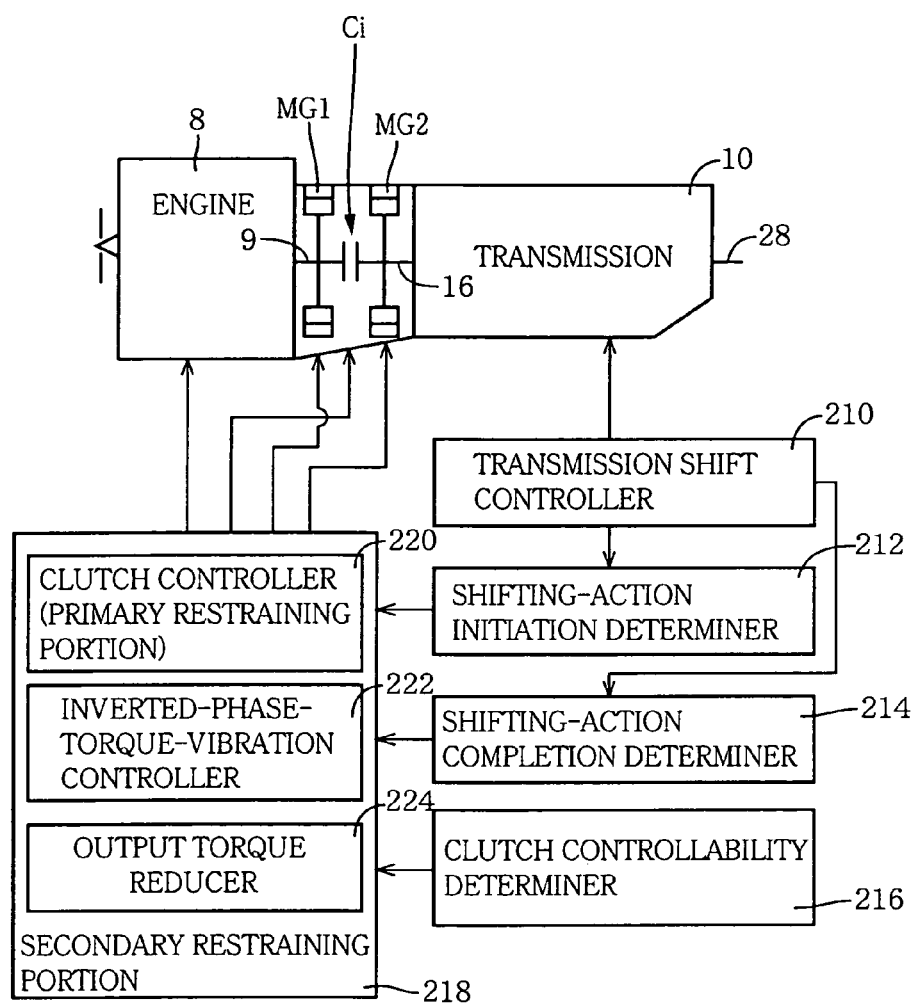
FIG. 16 is a block diagram showing various functional means incorporated in the ECU of FIG. 15.

FIG. 16 is a block diagram showing a portion of the ECU 190 which is assigned to the execution of the shock-absorbing control routine. The ECU 190 includes the transmission shift controller 210 which determines whether the transmission 10 should be shifted down or up, on the basis of the actual opening angle $\theta_{TH}$ (%) of the throttle valve 56 and the actual vehicle running speed V, and according to the shift control data map (as shown in FIG. 6) which is stored in the ROM of the ECU 190, and then transmits a shift command signal to the hydraulic control unit 98 if any shift-up or shift-down action of the transmission 10 is determined to be required, so that the required shift-up or shift-down action is automatically effected in the transmission 10.

The ECU 190 further includes a shifting-action initiation detector or determiner 212 and a shifting-action completion detector or determiner 214 which are assigned to detect an initiation and a completion of a shifting action of the transmission 10, respectively. Described specifically, the shifting-action initiation determiner 212 determines whether the shifting action in accordance with the transmission shift control routine by the transmission shift controller 210 has been initiated or not, depending upon whether the shift command signal has been outputted from the transmission shift controller 210. The shifting-action initiation determiner 212 determines that the shifting action is initiated when the shift command signal is detected. In each of time charts of FIGS. 9 and 10, "$t_1$" indicates a point of time at which the shift command signal is outputted. The shifting-action completion determiner 214 determines that the shifting action has been completed or not, depending upon whether the rotational speed Nin of the input shaft 16 of the transmission 10 has been changed from a value corresponding to a drive position before the shifting action, to a value corresponding to a speed position to which the transmission 10 is shifted as a result of the shifting action, or whether the rotational speed Nin of the input shaft 16 has come to be equal to a synchronous rotational speed (i.e., a product of a rotational speed Nout of the output shaft 28 of the transmission 10 and a newly established speed ratio of the transmission 10 which is established as a result of the shifting action). Further, the shifting-action completion determiner 214 also determines that the shifting action has been almost completed or not, depending upon whether the rotational speed Nin of the input shaft 16 has been almost equalized or become close to the synchronous rotational speed. Specifically, in the 2-3 shift-up action shown in FIG. 9, it is detected at a point of time $t_5$ that the rotational speed Nin of the input shaft 16 has been reduced to be equal to a synchronous rotational speed corresponding to the 3rd-speed position, and also detected at a point of time $t_4$ that the rotational speed Nin of the input shaft 16 has almost come down to be equal to the synchronous rotational speed. In the 3-2 shift-down action shown in FIG. 10, it is detected at a point of time $t_5$ that the rotational speed Nin of the input shaft 16 has been increased to be equalized to a synchronous rotational speed corresponding to the 2nd-speed position, and also detected at a point of time $t_4$ that the rotational speed Nin of the input shaft 16 has almost come up to be equal to the synchronous rotational speed.

Each of the time charts of FIGS. 9 and 10 illustrates an example in which the torque vibration generated immediately after completion of the shifting action is restrained by cooperation of the slipping of the clutch Ci and the application of the inverted-phase torque vibration. However, the application of the inverted-phase torque vibration may be made only where it is determined that the clutch Ci can not be placed in its slipping state, as discussed below.

The ECU 190 includes a clutch controllability determiner 216 operable to determine whether or not the clutch Ci is controllable by a clutch controller 220 to be placed in its slipping state or released state for restraining the torque vibration generated in the power transmitting path in the final stage of the shifting action. This determination can be made, for example, on the basis of operating conditions of the clutch control valve 96 and clutch Ci and a temperature of the clutch Ci. In this arrangement, the clutch controllability determiner 216 determines that the placement of the clutch Ci into its slipping state or released stat can not be made, for example, if a failure of either of the clutch control valve 96 and clutch Ci is detected, or the temperature of the clutch Ci is higher than a threshold.

Figure 17:
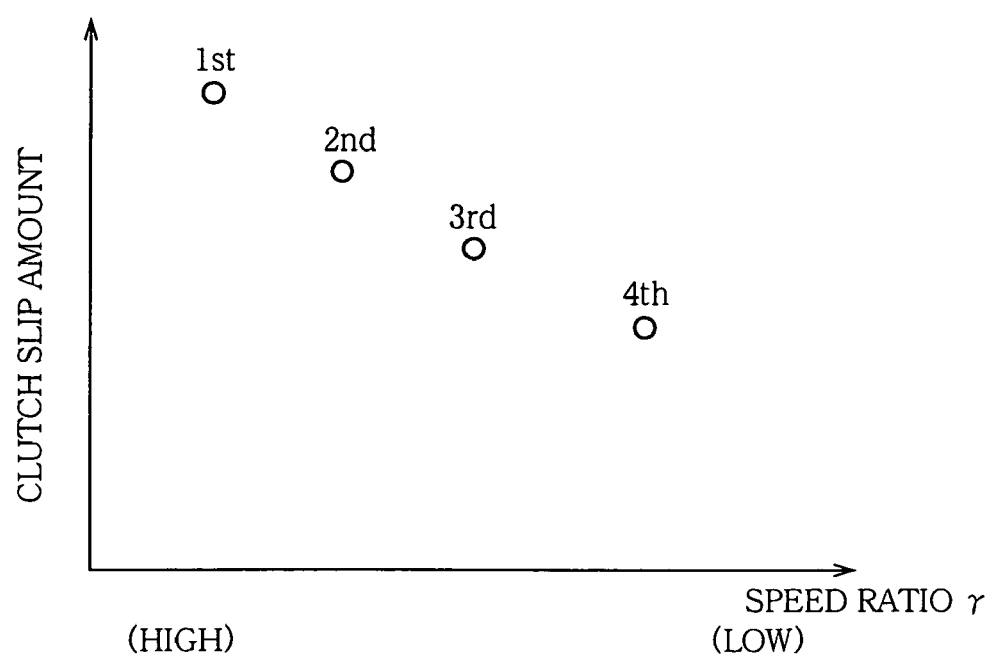
FIG. 17 is a graph showing a relationship (data map) which is used in determination made by a clutch controller of FIG. 16, for determining a clutch slip ratio on the basis of a speed ratio established in the transmission.

The clutch controller 220 is operated, upon determination made by the shifting-action completion determiner 214 that the shifting action has been completed or almost completed, to determine a slip control amount required for restraining the amplitude of the torque vibration generated in the power transmitting path upon completion of the shifting action, according to a relationship in the form of a data map (as shown in FIG. 17) which is stored in the ROM of the ECU 190, on the basis of the speed ratio γ which is currently established in the transmission 10. Then, the clutch controller 220 causes the engaging torque of the clutch Ci to be reduced by the clutch control valve 96 such that the clutch Ci provides the slip control amount. The reduction of the engaging torque of the clutch Ci is made temporarily in a stage in which the torque vibration is being generated, namely, in a time period between the point of time $t_4$ (at which the rotational speed Nin of the input shaft 16 is almost equalized to the synchronous rotational speed) and the point of time $t_6$ (at which the application of the inverted-phase torque vibration is terminated), as shown in FIGS. 9 and 10. It is noted that the above-described slip control amount corresponds to a slip amount of the clutch Ci.

The clutch controller 220 also determines a clutch slip ratio, according to a relationship in the form of a data map (as shown in FIG. 13) which is stored in the ROM of the ECU 190, on the basis of an actual torque control ratio (%). Then, the clutch controller 220 controls the clutch control valve 96 to cause the engaging torque of the clutch Ci to be reduced such that the clutch Ci temporarily exhibits the determined slip ratio, whereby the clutch Ci is temporarily slipped. The torque control ratio is defined as a ratio (%) of a part of the entire torque control amount which part is actually obtained through the operations of the inverted-phase-torque-vibration controller 222 and the output torque reducer 224, with respect to the entire torque control amount which is required to sufficiently restrain the torque vibration. The slip ratio is defined as a ratio (%) of a part of the entire slip amount which part is actually obtained, with respect to the entire slip amount required to restrain the torque vibration. Where the restraining of the torque vibration is intended by not only the slipping of the clutch Ci but also the other means such as the application of the inverted-phase torque vibration and the reduction of the output torque of the engine 8, the slip control amount is controlled by the clutch controller 220 to be made smaller than where it is intended by only the slipping of the clutch Ci. As is apparent from FIG. 13, the slip ratio as a target value is increased with a reduction of the torque control ratio, while being reduced with an increase of the torque control ratio.

In the present second embodiment, the clutch controller 220, the inverted-phase-torque-vibration controller 222 and the output torque reducer 224 cooperate to constitute a torque vibration restrainer. The clutch controller 220 constitutes a primary restraining portion of the torque vibration restrainer, while the inverted-phase-torque-vibration controller 222 and the output torque reducer 224 cooperate to constitute a secondary restraining portion 218 of the torque vibration restrainer. The secondary restraining portion 218 cooperates with the clutch controller 220 as the primary restraining portion, to restrain the torque vibration which is generated in the power transmitting path in a final stage of the shifting action or immediately after the shifting action. Specifically, the secondary restraining portion 218 causes the MG1 or MG2 to generate the inverted-phase torque vibration which is inverted in phase with respect to the generated torque vibration, for offsetting the generated torque vibration, and/or causes the output of the engine 8 to be temporarily reduced, for thereby restraining the torque vibration.

The inverted-phase-torque-vibration controller 222, which serves as a restraining torque applier, is operated where it is determined by the clutch controllability determiner 216 that the clutch Ci is not controllable by the clutch controller 220 to be placed in its slipping state or released state. The inverted-phase-torque-vibration controller 222 is operated to apply the restraining torque in the form of the inverted-phase torque vibration which is inverted in phase with respect to the torque vibration (generated immediately after the shifting action), to the power transmitting path, so as to restrain the generated torque vibration. In this instance, the inverted-phase-torque-vibration controller 222 first determines the amplitude of the inverted-phase torque vibration that is to be applied, according to the relationship in the form of the data map (as shown in FIG. 11) which is stored in the ROM of the ECU 190, on the basis of the speed ratio γ which is currently established in the transmission 10, an then causes the MG1 or MG2 to output the inverted-phase torque vibration having the determined amplitude, to the power transmitting path in the time period between points of time $t_5$ and $t_6$, as shown in FIGS. 9 and 10.

Further, the inverted-phase-torque-vibration controller 222 determines the torque control amount, according to the relationship in the form of the data map of FIG. 12 which is stored in the ROM of the ECU 190, on the basis of the reduction amount by which the output torque of the engine 8 is temporarily reduced by the output torque reducer 224. Then, the inverted-phase-torque-vibration controller 222 causes the MG1 or MG2 to output the inverted-phase torque vibration having the determined torque control amount, i.e., the determined amplitude, to the power transmitting path.

The output torque reducer 224 temporarily reduces the output torque of the engine 8, for example, by retarding the ignition timing of the engine 8, by reducing the opening angle $\theta_{TH}$ of the throttle valve 56, and/or by limiting a fuel injection amount, so as to restrain the amplitude of the torque vibration generated in the power transmitting path upon completion of the shifting action. It is noted that the temporal reduction of the output torque of the engine 8 is made in an inertia phase of the shifting action where the transmission 10 is shifted up, while it is made in a final stage of the inertia phase of the shifting action where the transmission 10 is shifted down.

Referring next to the flow chart of FIG. 18, there will be described in detail the shock-absorbing control routine which is executed by the ECU 190, with a predetermined cycle time.

The routine is initiated with step S11 which is implemented by the shifting-action initiation determiner 212, to determine whether a shifting action of the transmission 10 is being in its process or not. If a negative decision (NO) is obtained in step S11, one cycle of execution of the control routine is terminated after other controls have been effected in step S12. If an affirmative decision (YES) is obtained in step S11, the control flow goes to step S13 which is implemented by the output torque reducer 224, to temporarily reduce the output torque of the engine 8.

Step S13 is followed by step S14 which is implemented by the shifting-action completion determiner 214, to determine whether the shifting action has been completed or not, depending upon whether or not the rotational speed NE of the engine 8 has been equalized to a synchronous rotational speed corresponding to a drive position to which the transmission 10 has been shifted as a result of the shifting action.

If a negative decision (NO) is obtained in step S14, one cycle of execution of the control routine is terminated after other controls have been effected in step S12. If an affirmative decision (YES) is obtained in step S14, the control flow goes to step S15 which is implemented by the clutch controllability determiner 216, to determine whether or not the clutch Ci is controllable to be placed in its slipping state or released state for restraining the torque vibration generated in the power transmitting path in the final stage of the shifting action, on the basis of operating conditions of the clutch control valve 96 and clutch Ci and a temperature of the clutch Ci.

If an affirmative decision (YES) is obtained in step S15, the control flow goes to step S16 which is implemented by the clutch controller 220 to determine the slip amount and slip ratio, according to the data maps of FIGS. 17 and 13, on the basis of the speed ratio γ and the torque control amount. Then, the clutch controller 220 causes the engaging torque of the clutch Ci to be reduced to provide the determined slip amount and slip ratio. The reduction of the engaging torque of the clutch Ci is made temporarily in a stage in which the inverted-phase torque vibration is being applied to the power transmitting path. Then, one cycle of execution of the routine of FIG. 18 is completed with step S17 which is implemented to perform an operation to terminate the present shock-absorbing control routine.

If a negative decision (NO) is obtained in step S15, the control flow goes to step S18 which is implemented by the inverted-phase-torque-vibration controller 222, to determine the amplitude of the torque vibration generated as a result of the behavior of the engine 8 in which the rotational speed NE is forcedly kept to be equal to the synchronous speed, and also the amplitude (torque control amount) of the inverted-phase torque vibration that is to be outputted from the MG1 or MG2. The inverted-phase-torque-vibration controller 120 determines the amplitude of the generated torque vibration and that of the inverted-phase torque vibration, according to the data map of FIG. 11 which is stored in the ROM of the ECU 190, on the basis of the currently established speed ratio γ, and also determines the torque control amount, according to the data map of FIG. 12 which is stored in the ROM of the ECU 190, on the basis of the reduction amount by which the output torque of the engine 8 is temporarily reduced by the output torque reducer 224. Then, the inverted-phase-torque-vibration controller 222 causes the MG1 or MG2 to output the inverted-phase torque vibration having the determined torque control amount, i.e., the determined amplitude, to the power transmitting path in the time period between the points of time $t_5$ and $t_6$, as shown in FIGS. 9 and 10. Then, one cycle of execution of the routine of FIG. 18 is completed with step S17 which is implemented to perform an operation to terminate the present shock-absorbing control routine.

As is clear from the above description, in the control apparatus in the form of the ECU 190 constructed according to the present second embodiment of the invention, the torque vibration restrainer includes the clutch controller 220 operated to place the clutch Ci in its slipping state or released state upon completion of the shifting action in the transmission 10, thereby making it possible to absorb the torque vibration which is generated as a result of the quick stop of the change of the rotational speed of the engine 8, and accordingly advantageously reduce the shift shock caused by the torque vibration upon completion of the shifting action in the transmission 10. As described above, the clutch controller 220 constitutes the primary restraining portion of the torque vibration restrainer.

Further, the clutch controllability determiner 216 is provided to determine whether the placement of the clutch Ci in its slipping state or released state can be made or not upon completion of the shifting action, so that the restraining torque applier in the form of the inverted-phase-torque-vibration controller 222 of the secondary restraining portion 218 is operated to apply the restraining torque in the form of the inverted-phase torque vibration to the power transmitting path, in a case where it is determined by the clutch controllability determiner 216 that the placement of the clutch Ci in its slipping state or released state can not be made by the clutch controller 220 as the primary restraining portion. That is, in the case where the torque vibration can not be absorbed by the slipping or releasing of the clutch Ci, the torque vibration generated in the power transmitting path is restrained by the retraining torque in place of the slipping or releasing of the clutch Ci, whereby the shift shock can be minimized or reduced even in the case where the placement of the clutch Ci in its slipping state or released state can not be made.

Further, the inverted-phase-torque-vibration controller 222 as the restraining torque applier is arranged to cause the MG1 or MG2, which is operatively connected to the input shaft 16 of the transmission 10, to output the restraining torque for restraining the generated torque vibration, so that the generated toque vibration is restrained by the restraining torque applied to the power transmitting path, whereby the shift shock caused by the vibration torque can be reduced.

Further, the inverted-phase-torque-vibration controller 222 is arranged to cause the MG1 or MG2 to output, as the restraining torque, the inverted-phase torque vibration which is inverted in phase with respect to the generated torque vibration, so that the torque vibration can be effectively counteracted or offset by the inverted-phase torque vibration which is inverted in phase with respect to the generated torque vibration. The generated torque vibration can be thus effectively offset by the inverted-phase torque vibration, thereby making it possible to reduce the shift shock caused by the torque vibration which is generated upon completion of the shifting action.

Further, the secondary restraining portion 218 of the torque vibration restrainer includes the output torque reducer 224 operated to temporarily reduce the output torque of the engine 8 in the final stage of the shifting action. Since the torque vibration generated upon completion of the shifting action is reduced by the output torque reducer 224, it is possible to reduce the required amount of clutch slipping for absorbing the torque vibration and the required amplitude of the inverted-phase torque vibration for offsetting the torque vibration.

Further, the inverted-phase-torque-vibration controller 222 is arranged to change the amplitude of the inverted-phase torque vibration on the basis of the amount of reduction in the inertia torque which is generated upon completion of the shifting action, or on the basis of the kind of the shifting action currently effected in the transmission 10, so that the torque vibration generated upon completion of the shifting action can be offset by the inverted-phase torque vibration whose amplitude is suitably adjusted.

Further, the clutch controller 220 is arranged to change the amount of slipping of the clutch Ci on the basis of the amount of reduction in the inertia torque which is generated upon completion of the shifting action, or on the basis of the kind of the shifting action currently effected in the transmission 10, so that the torque vibration generated upon completion of the shifting action can be absorbed by the slipping of the clutch Ci whose amount is suitably adjusted.

Figure 19:
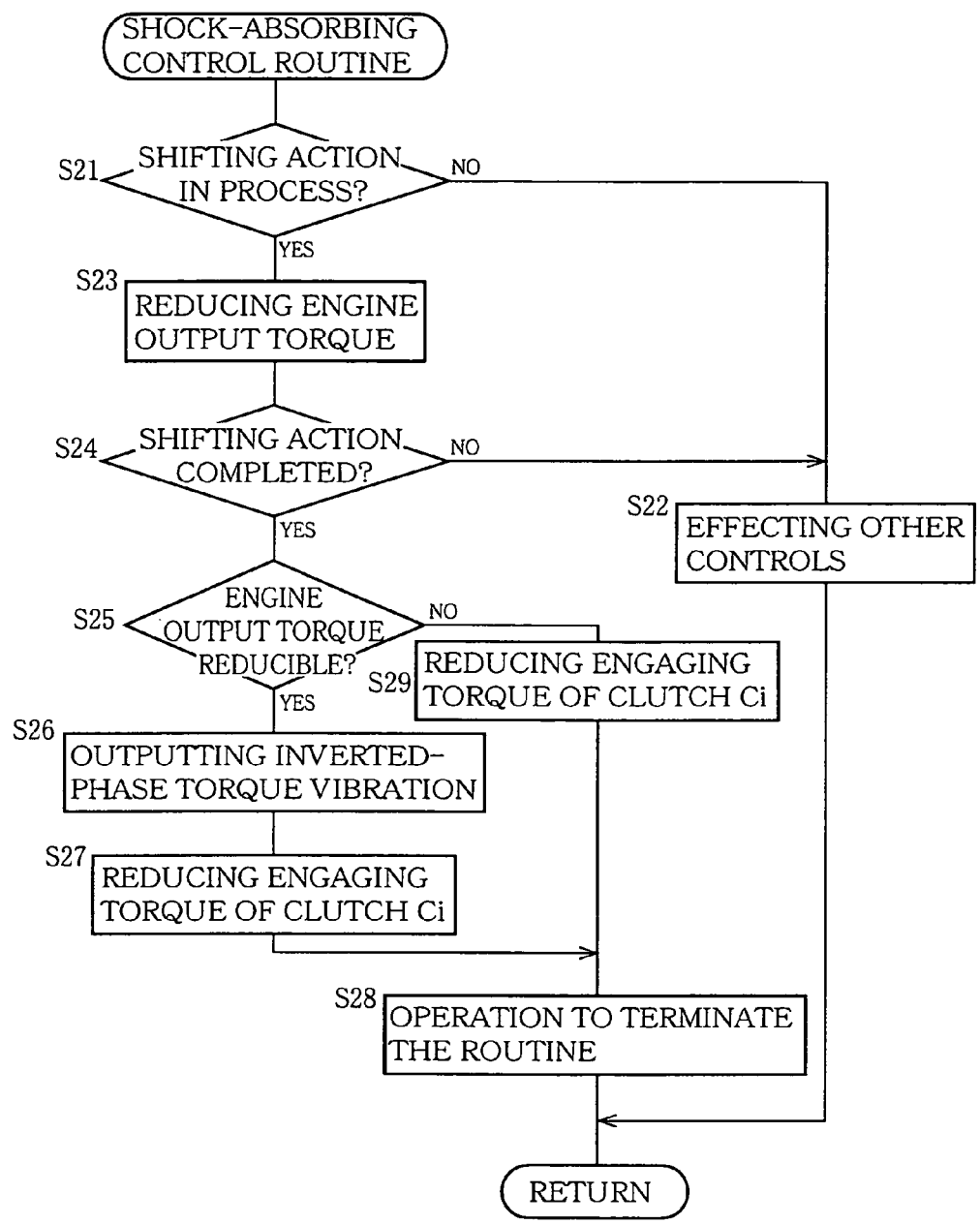
FIG. 19 is a flow chart illustrating a shock-absorbing control routine which is one of control routines executed by an electronic control unit (ECU) which is constructed according to a third embodiment of the invention.

FIG. 19 is a flow chart illustrating a shock-absorbing control routine which is one of control routines executed by an electronic control unit (ECU) which is constructed according to a third embodiment of the invention. This control routine is executed with a predetermined cycle time, too. It is noted that a portion of the ECU of this third embodiment, which is assigned to the execution of the shock-absorbing control routine, is substantially identical in construction and function with that of the ECU 190 of the above-described second embodiment shown in FIG. 16, except that the clutch controllability determiner 216 is replaced with a torque reducibility determiner which is described below.

Figure 18:
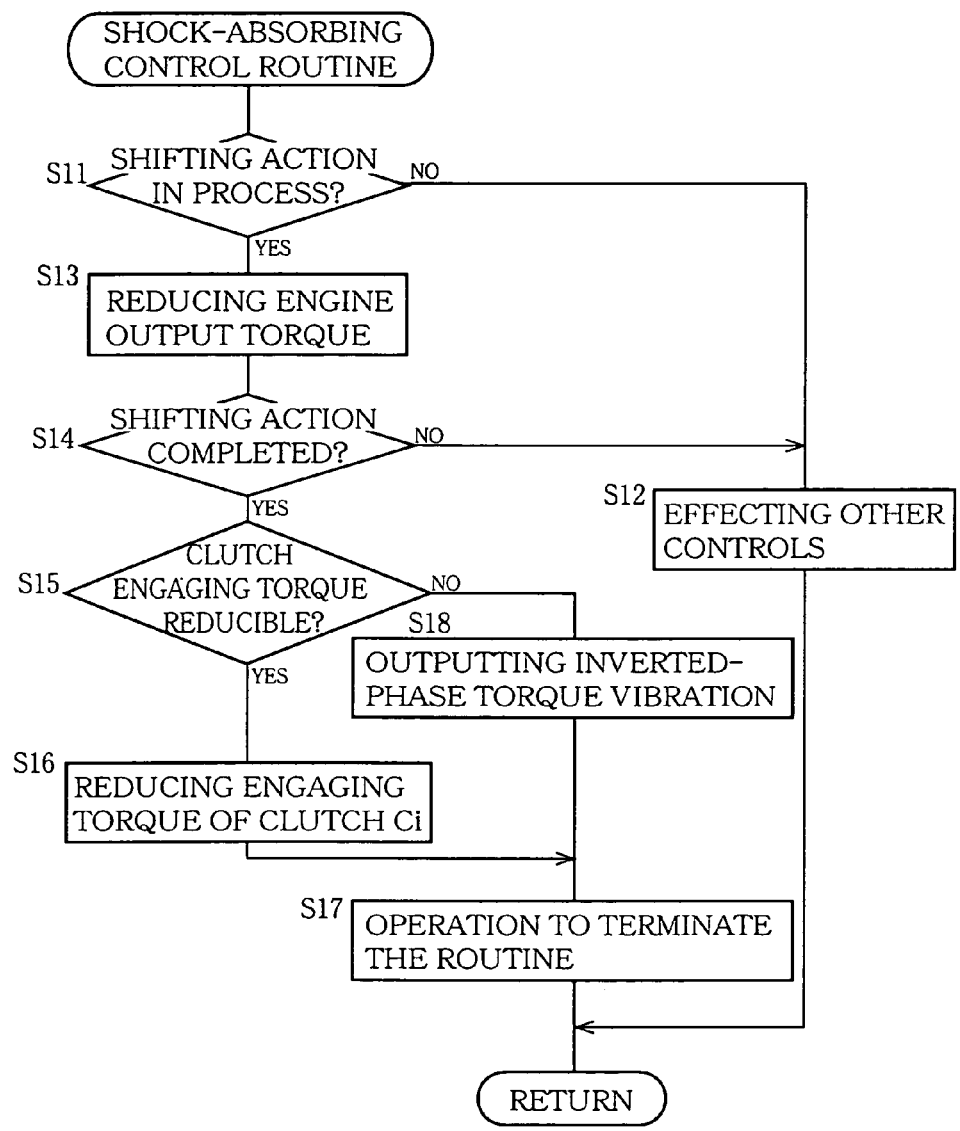
FIG. 18 is a flow chart illustrating a shock-absorbing control routine which is one of control routines executed by the ECU of FIG. 15.

In the routine of FIG. 19, steps S21-S24 are implemented in the same manner as steps S11-S14 of the above-described routine of FIG. 18 in the second embodiment. That is, if a negative decision (NO) is obtained in step S21, one cycle of execution of the control routine is terminated after other controls have been effected in step S22. If an affirmative decision (YES) is obtained in step S21, the control flow goes to step S23 which is implemented by the output torque reducer 224, to temporarily reduce the output torque of the engine 8. Temporal reduction of the output torque of the engine 8 is made throughout the inertia phase in which the rotational speed NE of the engine 8 is changed, where the transmission 10 is shifted up, as shown in FIG. 9. The temporal reduction of the output torque of the engine 8 is made in the final stage of the inertia phase, where the transmission 10 is shifted down, as shown in FIG. 10. Step S23 is followed by step S24 which is implemented to determine whether the shifting action has been completed or not, in the same manner as in step S14 of the routine of FIG. 18, namely, depending upon whether or not the rotational speed NE of the engine 8 has been equalized to a synchronous rotational speed corresponding to a drive position to which the transmission 10 has been shifted as a result of the shifting action.

If a negative decision (NO) is obtained in step S24, one cycle of execution of the control routine is terminated after the other controls have been effected in step S22. If an affirmative decision (YES) is obtained in step S24, the control flow goes to step S25 which is implemented by the torque reducibility determiner, to determine whether the output torque of the engine 8 or the input torque of the transmission 10 is controllable to be temporarily reduced or not, for example, on the basis of the operating condition of the igniter device 94 and the temperature Tre of the catalyst. In this arrangement, the torque reducibility determiner determines that the temporal reduction of the output torque of the engine 8 or the input torque of the transmission 10 can not be made, for example, if a failure of the igniter device 94 is detected or the temperature Tre is higher than a threshold.

If an affirmative decision (YES) is obtained in step S25, the control flow goes to step S26 which is implemented by the inverted-phase-torque-vibration controller 222, to determine the amplitude of the torque vibration generated as a result of the behavior of the engine 8 in which the rotational speed NE is forcedly kept to be equal to the synchronous speed, and also the amplitude of the inverted-phase torque vibration that is to be outputted from the MG1 or MG2. The inverted-phase-torque-vibration controller 222 determines the amplitude of the generated torque vibration and that of the inverted-phase torque vibration, according to the data map of FIG. 11 which is stored in the ROM of the ECU, on the basis of the currently established speed ratio γ, and then causes the MG1 or MG2 to output the inverted-phase torque vibration having the determined amplitude, to the power transmitting path. Concurrently with the implementation of step S26, step S27 is implemented by the clutch controller 220, to determine the clutch slip ratio, according to the data map of FIG. 13 which is stored in the ROM of the ECU, on the basis of the actual torque control ratio, and then cause the engaging torque of the clutch Ci to be reduced such that the clutch Ci exhibits the determined slip ratio. Then, one cycle of execution of the routine of FIG. 19 is completed with step S28 which is implemented to perform an operation to terminate the present shock-absorbing control routine.

If a negative decision (NO) is obtained in step S25, the control flow goes to step S29 in which the clutch slip ratio is determined by the clutch controller 220, such that the slip ratio is determined to be higher than where the ratio is determined in step S27. Then, in the stage in which the inverted-phase torque vibration is being applied to the power transmitting path, the engaging torque of the clutch Ci is temporarily reduced such that the clutch Ci exhibits the determined slip ratio. Step S29 is followed by step S28 to perform the operation to terminate the present shock-absorbing control routine.

As is clear from the above description, like each of the above-described ECUs 90, 190 of the first and second embodiments, the ECU of the preset third embodiment of the invention is capable of advantageously reducing the shift shock upon completion of the shifting action. Further, in the third embodiment, where it is determined that the reduction of the output torque of the engine 8 or the input torque of the transmission 10 can not be made, the engaging torque of the clutch Ci is temporarily reduced such that the clutch Ci exhibits the slip ratio which is determined to be higher than where it is determined that the reduction of the output torque of the engine 8 or the input torque of the transmission 10 can be made. It is therefore possible to reduce the shift shock even where the reduction of the output torque of the engine 8 or the input torque of the transmission 10 can not be made. It is noted that the shock-absorbing control routine of the present third embodiment may be modified, for example, such that the control routine is executed without step S27 which is implemented where the affirmative decision (YES) is obtained in step S25, or such that a step equivalent to step S26 may be additionally provided to be implemented just before or immediately after step S29.

While the preferred embodiments of this invention have been described above in detail by reference to the drawings, for illustrative purpose only, it is to be understood that the present invention may be otherwise embodied.

In the above-described embodiments, the MG2 is provided on the input shaft 16 of the transmission 10. However, it is also possible to provide the MG2 on a downstream side of the input shaft 16, for example, between the input shaft 16 and the output shaft 28 of the transmission 10.

In the above-described embodiments, the clutch controller 122, 220 causes the clutch Ci to be temporarily slipped during the shifting action, for reducing the toque vibration. However, the clutch Ci may be temporarily held in its released state during the shifting action, rather than being held in its slipping state.

In the above-described embodiments, the inverted-phase-torque-vibration controller 120, 222 determines the torque control amount, i.e., the amplitude of the inverted-phase torque vibration, according to the relationship shown in FIG. 11 on the basis of the speed ratio γ which is actually established in the transmission 10, and also according to the relationship shown in FIG. 12 on the basis of the reduction amount by which the output torque of the engine 8 is temporarily reduced by the output torque reducer 124, 224 during the shifting action. However, the amplitude of the inverted-phase torque vibration may be determined based on one of the speed ratio γ of the transmission 10 and the reduction amount of the output torque of the engine 8. Further, the amplitude of the inverted-phase torque vibration does not necessarily have to be determined based on the speed ratio γ and the torque reduction amount, but may be provided by a constant value.

In the above-described embodiments, the determination of the amplitude of the inverted-phase torque vibration is made according to the relationship represented by the graph whose horizontal axis indicates the speed ratio γ established in the transmission 10 before or after the shifting action executed therein (see FIG. 11). However, the horizontal axis of the graph may be indicative of a kind of shifting action such as 1-2 shift up action, 2-3 shift up action and 3-4 shift up action, or an inertia torque amount, in place of the speed ratio γ. That is, the determination may be made also according to a relationship between the torque control amount and the kind of shifting action, or according to a relationship between the torque control amount and the inertia torque amount. The horizontal axis of the graph representative of the relationship used for the determination of the amplitude of the inverted-phase torque vibration may be indicative of any parameter relating to the amount of the inertia torque, since the amplitude of the torque vibration corresponds to the amount of the inertia torque which is generated upon stop of the change of the rotational speed of the engine 8 which takes place when the rotational speed becomes equal to a synchronous speed corresponding to the established speed ratio γ. A skip shifting (such as 1-3 shift up action, 2-4 shift up action, 3-1 shift down action and 4-2 shift down action) causes the speed ratio γ of the transmission 10 to be changed largely in step, and the large change in the speed ratio γ leads to a large change in the torque control amount, as shown in FIG. 11.

In the above-described first embodiment, the clutch controller 122 determines the clutch slip ratio according to the relationship shown in FIG. 13 on the basis of the torque control ratio. However, the slip ratio does not have to be determined based on the toque control ratio, but may be provided by a constant value. It is noted that a data map representative of a relationship between the slip ratio and the torque control amount may be used as an alternative data map for determining the slip ratio, in place of the data map of FIG. 13 representative of the relationship between the slip ratio and the torque control ratio. As long as the torque control ratio is not considerably variable, the determination of the slip ratio according to the alternative data map (representative of the relationship between the slip ratio and the torque control amount) provides substantially the same technical advantage as the determination according to the data map of FIG. 13.

In the above-described second embodiment, the clutch controller 220 determines the slip amount and the slip ratio of the clutch Ci, according to the relationship shown in FIG. 17 on the basis of the speed ratio γ which is currently established in the transmission 10, and also according to the relationship shown in FIG. 13 on the basis of the torque control ratio relating to the output torque reducer 224 which is temporarily operated during the shifting action. However, the slip amount and the slip ratio of the clutch Ci may be determined based on one of the speed ratio γ and the torque control ratio, or may be determined based on neither the speed ratio γ nor the torque control ratio. For example, the slip amount may be provided by a constant value.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A control apparatus for controlling a stepped automatic transmission of a vehicle having an output shaft and an input shaft which is to be mechanically connected to an engine of the vehicle while a shifting action is being effected in the transmission, comprising:

a torque vibration restrainer operable, upon completion of the shifting action in the transmission, to restrain a torque vibration which is generated in a power transmitting path of the vehicle; and a shifting-action completion determiner operable to determine whether the shifting action has been completed or not, depending upon whether a rotational speed of the input shaft has been substantially equalized to a product of a rotational speed of the output shaft and a newly established speed ratio of the transmission which is established as a result of the shifting action.

wherein said shifting-action completion determiner determines that the shifting action has been completed when the rotational speed of the input shaft has been substantially equalized to the product of the rotational speed of the output shaft and the newly established speed ratio of the transmission.

and wherein said torque vibration restrainer is initiated to be operated, upon determination by said shifting-action completion determiner that the shifting action has been completed, to restrain the torque vibration.

2. The control apparatus according to claim 1, wherein said torque vibration restrainer includes an inverted-phase-torque-vibration controller operable to cause a motor which is operatively connected to the input shaft of the transmission, to output said inverted-phase torque vibration.

3. The control apparatus according to claim 1, wherein said torque vibration restrainer includes (i) an output torque reducer operable to temporarily reduce an output torque of the engine in a final stage of the shifting action, and (ii) an inverted-phase-torque-vibration controller operable to change an amplitude of said inverted-phase torque vibration on the basis of a reduction amount by which the output torque of the engine is reduced by said output torque reducer.

4. The control apparatus according to claim 1, wherein said torque vibration restrainer includes an inverted-phase-torque-vibration controller operable to change an amplitude of said inverted-phase torque vibration on the basis of a currently selected one of drive positions of the stepped automatic transmission.

5. A control apparatus for controlling a stepped automatic transmission of a vehicle having an output shaft and an input shaft which is to be mechanically connected to an engine of the vehicle while a shifting action is being effected in the transmission, comprising:

a torque vibration restrainer applying an inverted-phase torque vibration which is inverted in phase with respect to the generated torque vibration to the power transmitting path upon completion of the shifting action in the transmission to restrain a torque vibration which is generated in a power transmitting path of the vehicle;

a clutch controller included in said torque vibration restrainer and operable upon completion of the shifting action in the transmission, to temporarily place a clutch which is to be engaged for direct connection of the input shaft and the engine in one of a slipping state thereof and a released state thereof; and an inverted-phase-torque-vibration availability determiner operable to determine whether application of said inverted-phase torque vibration to the power transmitting path by said torque vibration restrainer can be made upon completion of the shifting action, wherein said clutch controller of said torque vibration restrainer is operated where it is determined by said inverted-phase-torque-vibration availability determiner that the application of said inverted-phase torque vibration by said torque vibration restrainer can not be made, so as to temporarily place the clutch in said one of the slipping state thereof and the released state thereof, for restraining the generated torque vibration.

6. A control apparatus for controlling a stepped automatic transmission of a vehicle having an output shaft and an input shaft which is to be mechanically connected to an engine of the vehicle while a shifting action is being effected in the transmission, comprising:

a torque vibration restrainer operable, upon completion of the shifting action in the transmission, to restrain a torque vibration which is generated in a power transmitting path of the vehicle;

a clutch controller included in said torque vibration restrainer and operable, upon completion of the shifting action in the transmission, to place a clutch which is to be engaged for direct connection of the input shaft and the engine in one of a slipping state thereof and a released state thereof, for restraining the generated torque vibration:

a clutch controllability determiner operable to determine whether placement of the clutch in said one of the slipping state and the released state can be made upon completion of the shifting action; and a restraining torque applier included in said torque vibration restrainer and operable where it is determined by said clutch controllability determiner that the placement of the clutch in said one of the slipping state and the released state can not be made, so as to apply a restraining torque to the power transmitting path, for restraining the generated torque vibration.

7. The control apparatus according to claim 6, wherein said restraining torque applier of said torque vibration restrainer causes a motor operatively connected to the input shaft of the transmission, to output said restraining torque for restraining the generated torque vibration.

8. The control apparatus according to claim 7, wherein said restraining torque applier of said torque vibration restrainer includes an inverted-phase-torque-vibration controller operable to cause the motor to output, as said restraining torque, an inverted-phase torque vibration which is inverted in phase with respect to the generated torque vibration.

9. The control apparatus according to claim 8, wherein said inverted-phase-torque-vibration controller changes an amplitude of said inverted-phase torque vibration on the basis of an amount of reduction in an inertia torque which is generated upon completion of the shifting action.

10. The control apparatus according to claim 8, wherein said inverted-phase-torque-vibration controller changes an amplitude of said inverted-phase torque vibration on the basis of a kind of the shifting action effected in the transmission.

11. The control apparatus according to claim 6, wherein said clutch controller of said torque vibration restrainer changes an amount of slipping of the clutch on the basis of a kind of the shifting action effected in the transmission.

12. A control apparatus for controlling a stepped automatic transmission of a vehicle having an output shaft and an input shaft which is to be mechanically connected to an engine of the vehicle while a shifting action is being effected in the transmission, comprising:

a torque vibration restrainer operable, upon completion of the shifting action in the transmission, to restrain a torque vibration which is generated in a power transmitting path of the vehicle;

a clutch controller included in said torque vibration restrainer and operable, upon completion of the shifting action in the transmission, to place a clutch which is to be engaged for direct connection of the input shaft and the engine in one of a slipping state thereof and a released state thereof for restraining the generated torque vibration: and an output torque reducer included in said torque vibration restrainer and operable to temporarily reduce an output torque of the engine in a final stage of the shifting action wherein said clutch controller is operated to place the clutch in said one of the slipping state thereof and the released state thereof, if a temporal reduction of the output torque of the engine by said output torque reducer can not be made.

13. A control apparatus for controlling a stepped automatic transmission of a vehicle having an output shaft and an input shaft which is to be mechanically connected to an engine of the vehicle while a shifting action is being effected in the transmission, comprising:

a torque vibration restrainer operable, upon completion of the shifting action in the transmission, to restrain a torque vibration which is generated in a power transmitting path of the vehicle;

a clutch controller included in said torque vibration restrainer and operable, upon completion of the shifting action in the transmission, to place a clutch which is to be engaged for direct connection of the input shaft and the engine in one of a slipping state thereof and a released state thereof, for restraining the generated torque vibration;

wherein said clutch controller of said torque vibration restrainer changes an amount of slipping of the clutch on the basis of an amount of reduction in an inertia torque which is generated upon completion of the shifting action.

* * * * *